(12) United States Patent
Matsumoto et al.

(10) Patent No.: US 7,680,569 B2
(45) Date of Patent: Mar. 16, 2010

(54) AUTOMOTIVE LANE DEVIATION PREVENTION APPARATUS

(75) Inventors: Shinji Matsumoto, Kanagawa (JP); Satoshi Tange, Kanagawa (JP); Tatsuya Suzuki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 545 days.

(21) Appl. No.: 10/828,462

(22) Filed: Apr. 21, 2004

(65) Prior Publication Data

US 2004/0230375 A1 Nov. 18, 2004

(30) Foreign Application Priority Data

May 12, 2003 (JP) .............................. 2003-132899

(51) Int. Cl.
*G06F 19/00* (2006.01)
(52) U.S. Cl. ........................... 701/28; 701/41; 180/167; 180/168
(58) Field of Classification Search ................ 180/167, 180/168, 443; 701/28, 41, 70
See application file for complete search history.

(56) References Cited

U.S. PATENT DOCUMENTS

| | | | | |
|---|---|---|---|---|
| 5,367,457 A | * | 11/1994 | Ishida | 701/28 |
| 5,604,307 A | * | 2/1997 | Iida et al. | 73/146.2 |
| 5,638,275 A | * | 6/1997 | Sasaki et al. | 701/38 |
| 5,765,116 A | * | 6/1998 | Wilson-Jones et al. | 701/41 |
| 5,913,375 A | * | 6/1999 | Nishikawa | 180/168 |
| 6,014,595 A | * | 1/2000 | Kobayashi | 701/1 |
| 6,021,367 A | * | 2/2000 | Pilutti et al. | 701/41 |
| 6,053,270 A | * | 4/2000 | Nishikawa et al. | 180/168 |
| 6,185,492 B1 | * | 2/2001 | Kagawa et al. | 701/41 |
| 7,102,539 B2 | | 9/2006 | Kawazoe et al. | |
| 7,109,850 B2 | * | 9/2006 | Kawazoe et al. | 340/425.5 |
| 2002/0007239 A1 | * | 1/2002 | Matsumoto et al. | 701/41 |
| 2002/0013647 A1 | * | 1/2002 | Kawazoe et al. | 701/41 |

(Continued)

FOREIGN PATENT DOCUMENTS

DE 10 2004 019 896 A1 11/2004

(Continued)

OTHER PUBLICATIONS

U.S. Appl. No. 10/825,108, filed Apr. 16, 2004, Matsumoto et al.

*Primary Examiner*—Khoi H. Tran
*Assistant Examiner*—Ronnie Mancho
(74) *Attorney, Agent, or Firm*—Foley & Lardner LLP

(57) ABSTRACT

An automotive lane deviation prevention (LDP) apparatus includes a control unit connected to a yawing-motion control actuator for LDP control purposes. The control unit determines, based on information regarding a lane marking line detected based on a picture image in front of a host vehicle, whether the host vehicle is in a state $F_{LD} \neq 0$ where there is an increased tendency for the host vehicle to deviate from the driving lane. The control unit executes, based on a state $Fdw \neq 0$ where the host vehicle is traveling on predetermined irregularities formed on or close to the lane marking line and the information regarding the lane marking line, vehicle yawing motion control by which the host vehicle returns to a central position of the driving lane, in a lane-marking non-detecting state $F_{camready} = 0$ where the lane marking line is out of an image pick-up enabling area.

10 Claims, 11 Drawing Sheets

U.S. PATENT DOCUMENTS

| | | | |
|---|---|---|---|
| 2002/0087255 A1* | 7/2002 | Jindo et al. | 701/96 |
| 2002/0156581 A1* | 10/2002 | Matsuura | 701/301 |
| 2003/0072471 A1 | 4/2003 | Otsuka et al. | |
| 2003/0123930 A1* | 7/2003 | Jacobs et al. | 404/12 |
| 2004/0098197 A1 | 5/2004 | Matsumoto et al. | |
| 2004/0102884 A1 | 5/2004 | Tange et al. | |
| 2004/0107035 A1 | 6/2004 | Tange et al. | |
| 2006/0224293 A1 | 10/2006 | Kawazoe et al. | |
| 2006/0224294 A1 | 10/2006 | Kawazoe et al. | |
| 2006/0225936 A1 | 10/2006 | Kawazoe et al. | |
| 2006/0229792 A1 | 10/2006 | Kawazoe et al. | |
| 2006/0229840 A1 | 10/2006 | Kawazoe et al. | |
| 2006/0271265 A1 | 11/2006 | Kawazoe et al. | |

FOREIGN PATENT DOCUMENTS

| | | |
|---|---|---|
| JP | 07-160993 A | 6/1995 |
| JP | 11-180327 A | 7/1999 |
| JP | 2000-33860 A | 2/2000 |
| JP | 2001-310719 A | 11/2001 |

* cited by examiner

RIDGED PORTION FORMED WHITE LANE MARKING

WHEEL ACCELERATION $dVw_{FL}$

COUNT VALUE $Ts_{FL}$ OF COUNT-DOWN TIMER

ROAD-SURFACE ESTIMATION STARTING FLAG $Frs_{FL}$

COUNT VALUE $Trs_{FL}$ OF ROAD-SURFACE IRREGULARITIES ESTIMATION TIMER

ROAD-SURFACE IRREGULARITIES DECISION FLAG $Fot_{FL}$

US 7,680,569 B2

AUTOMOTIVE LANE DEVIATION PREVENTION APPARATUS

TECHNICAL FIELD

The present invention relates to an automotive lane deviation prevention apparatus, and specifically to the improvement of an automatic lane deviation prevention control technology capable of preventing a host vehicle from deviating from its driving lane even when the host vehicle tends to deviate from the driving lane under a condition where a white lane marking is out of an image pick-up enabling area of a vehicle-mounted charge-coupled device (CCD) camera and thus a lane-deviation tendency cannot be satisfactorily detected from the picture image data captured by the vehicle-mounted camera.

BACKGROUND ART

In recent years, there have been proposed and developed various automatic lane deviation prevention control technologies and vehicle dynamics control technologies. On automotive vehicles having both the vehicle dynamics control (VDC) function and lane deviation prevention (LDP) function, generally, there are two types of lane deviation prevention control, namely, an LDP control system using a steering actuator and an LDP control system using braking force actuators. In the steering-actuator equipped LDP control system, lane deviation is prevented by producing a yaw moment by way of steering-torque control whose controlled variable is determined depending on a host vehicle's lateral displacement or a host vehicle's lateral deviation from a central axis (a reference axis) of the current host vehicle's driving lane. One such steering-actuator equipped LDP control system has been disclosed in Japanese Patent Provisional Publication No. 11-180327 (hereinafter is referred to as JP11-180327).

On the other hand, in the braking-force-actuator equipped LDP control system, lane deviation is prevented by producing a yaw moment by controlling braking force actuators, such as an ABS-system hydraulic modulator, depending on a host vehicle's lateral deviation from a central axis of the current host vehicle's driving lane. Usually, in order to produce the yaw moment for lane deviation avoidance, braking forces are applied to the road wheels opposite to the direction that the lane deviation occurs. One such braking-force-actuator equipped LDP control system has been disclosed in Japanese Patent Provisional Publication Nos. 2000-33860 (hereinafter is referred to as JP2000-33860) and 2001-310719 (hereinafter is referred to as JP2001-310719).

LDP control systems as disclosed in JP11-180327, JP2000-33860, and JP2001-310719, often use a vehicle-mounted charge-coupled device (CCD) camera and a camera controller as an external recognizing sensor, which functions to detect a position of the host vehicle within the host vehicle's traffic lane and whose sensor signal is used for the lane deviation avoidance control or lane deviation prevention control. Within the camera controller, on the basis of an image-processing picture image data in front of the host vehicle and captured by the CCD camera, a white lane marking, such as a white line, is detected and thus the current host vehicle's traffic lane, exactly, the current position information of the host vehicle within the driving lane, in other words, information regarding whether the host vehicle tends to deviate from the driving lane, is detected.

SUMMARY OF THE INVENTION

However, in case of the way to detect the white lane marking based on the picture image data captured by the vehicle-mounted camera, it is impossible or difficult to precisely detect or determine the lane deviation tendency of the host vehicle from the driving lane, when the white lane marking is out of the image pick-up enabling area of the vehicle-mounted camera and thus it is impossible to detect the white lane marking from the picture image data. Under such a condition that a white lane marking is out of an image pick-up enabling area of the vehicle-mounted camera, the LDP control system tends to disable or disengage or suspend the lane deviation prevention (LDP) function. As a result of this, the LDP control system's ability to avoid the host vehicle's lane deviation is undesirably remarkably lowered.

Accordingly, it is an object of the invention to provide an automotive lane deviation prevention (LDP) apparatus, capable of greatly enhancing the LDP control performance even when a white lane marking is out of an image pick-up enabling area of a vehicle-mounted camera (an external recognizing sensor).

In order to accomplish the aforementioned and other objects of the present invention, an automotive lane deviation prevention (LDP) apparatus comprises an automotive lane deviation prevention apparatus comprises a processor programmed to perform the following, detecting a lane marking line on a driving lane of a host vehicle, based on a picture image in front of the host vehicle, determining, based on a detection result regarding the lane marking line, whether the host vehicle is in a first state $F_{LD} \neq 0$ where there is an increased tendency for the host vehicle to deviate from the driving lane or in a second state $F_{LD}=0$ where there is a less tendency for the host vehicle to deviate from the driving lane, executing LDP control by which the host vehicle's lane deviation tendency is avoided, when the host vehicle is in the first state $F_{LD} \neq 0$, determining whether the host vehicle is in a third state $Fdw \neq 0$ where the host vehicle is traveling on predetermined irregularities formed on or close to the lane marking line, in a lane-marking non-detecting state where the lane marking line is out of an image pick-up enabling area, and executing, based on a detection result regarding whether the host vehicle is in the third state $Fdw \neq 0$ and the detection result regarding the lane marking line, vehicle yawing motion control by which the host vehicle returns to a central position of the driving lane, in the lane-marking non-detecting state.

According to another aspect of the invention, an automotive lane deviation prevention (LDP) apparatus comprises a lane marking detector that detects a lane marking line on a driving lane of a host vehicle, based on a picture image in front of the host vehicle, an actuator capable of variably adjusting a yawing motion of the host vehicle, a control unit configured to be electronically connected to the lane marking detector and the actuator for vehicle yawing motion control and LDP control purposes, the control unit comprising a lane-deviation tendency detection section that determines, based on a detection result regarding the lane marking line, whether the host vehicle is in a first state $F_{LD} \neq 0$ where there is an increased tendency for the host vehicle to deviate from the driving lane or in a second state $F_{LD}=0$ where there is a less tendency for the host vehicle to deviate from the driving lane, an LDP control section that executes the LDP control by which the host vehicle's lane deviation tendency is avoided, when the host vehicle is in the first state $F_{LD}\neq0$, a road-surface irregularities detection section that determines whether the host vehicle is in a third state Fdw≠0 where the host vehicle is traveling on predetermined irregularities formed on or close to the lane marking line, and a vehicle yawing motion control section that executes, based on a detection result of the road-surface irregularities detection section and the detection result of the lane-deviation tendency detection section, vehicle yawing motion control by which the host vehicle returns to a central position of the driving lane, in a lane-marking non-detecting state where the lane marking line is out of an image pick-up enabling area. It is preferable that the vehicle yawing motion control section may maintain a controlled variable of the LDP control at a previous value for a predetermined time period, when the host vehicle is conditioned in the first ($F_{LD}\neq0$) and third (Fdw≠0) states in presence of a transition from a lane-marking detecting state where the lane marking line is within the image pick-up enabling area to the lane-marking non-detecting state. Preferably, the vehicle yawing motion control section may initiate the vehicle yawing motion control by which the host vehicle returns to the central position of the driving lane, when the host vehicle is conditioned in the second ($F_{LD}=0$) and third (Fdw≠0) states in presence of a transition from a lane-marking detecting state where the lane marking line is within the image pick-up enabling area to the lane-marking non-detecting state. More preferably, the control unit may further comprise a lane-deviation tendency estimation section that estimates, based on the lane marking line detected by the lane marking detector before the transition from the lane-marking detecting state to the lane-marking non-detecting state, whether the host vehicle is in a fourth state $F_{LD2}\neq0$ where there is an increased tendency for the host vehicle to deviate from the driving lane or in a fifth state $F_{LD2}=0$ where there is a less tendency for the host vehicle to deviate from the driving lane, and the vehicle yawing motion control section may initiate the vehicle yawing motion control by which the host vehicle returns to the central position of the driving lane, when the host vehicle is conditioned in the second ($F_{LD}=0$), third (Fdw≠0) and fourth ($F_{LD2}\neq0$) states in presence of the transition from the lane-marking detecting state to the lane-marking non-detecting state.

According to a further aspect of the invention, an automotive lane deviation prevention apparatus comprises a lane marking detection means for detecting a lane marking line on a driving lane of a host vehicle, based on a picture image in front of the host vehicle, a yawing-motion control actuator capable of variably adjusting a yawing motion of the host vehicle, a control unit configured to be electronically connected to the lane marking detection means and the yawing-motion control actuator for vehicle yawing motion control and lane deviation prevention (LDP) control purposes, the control unit comprising lane-deviation tendency detection means for determining, based on a detection result regarding the lane marking line, whether the host vehicle is in a first state $F_{LD}\neq0$ where there is an increased tendency for the host vehicle to deviate from the driving lane or in a second state $F_{LD}=0$ where there is a less tendency for the host vehicle to deviate from the driving lane, LDP control means for executing the LDP control by which the host vehicle's lane deviation tendency is avoided, when the host vehicle is in the first state $F_{LD}\neq0$, road-surface irregularities detection means for determining whether the host vehicle is in a third state Fdw≠0 where the host vehicle is traveling on predetermined irregularities formed on or close to the lane marking line, and vehicle yawing motion control means for executing, based on a detection result of the road-surface irregularities detection means and the detection result of the lane-deviation tendency detection means, vehicle yawing motion control by which the host vehicle returns to a central position of the driving lane, in a lane-marking non-detecting state where the lane marking line is out of an image pick-up enabling area.

According to another aspect of the invention, a method of preventing lane deviation of a host vehicle employing braking force actuators that adjust braking forces applied to respective road wheels, the method comprises detecting a lane marking line on a driving lane of a host vehicle, based on a picture image in front of the host vehicle, determining, based on a detection result regarding the lane marking line, whether the host vehicle is in a first state $F_{LD}\neq0$ where there is an increased tendency for the host vehicle to deviate from the driving lane or in a second state $F_{LD}=0$ where there is a less tendency for the host vehicle to deviate from the driving lane, executing lane deviation prevention control by feedback-controlling the braking forces applied to the road wheels so that the host vehicle's lane deviation tendency is avoided, when the host vehicle is in the first state $F_{LD}\neq0$, determining whether the host vehicle is in a third state Fdw≠0 where the host vehicle is traveling on predetermined irregularities formed on or close to the lane marking line, in a lane-marking non-detecting state where the lane marking line is out of an image pick-up enabling area, and executing, based on a detection result regarding whether the host vehicle is in the third state Fdw≠0 and the detection result regarding the lane marking line, vehicle yawing motion control by which the host vehicle returns to a central position of the driving lane, in the lane-marking non-detecting state.

According to another aspect of the invention, a method of preventing lane deviation of a host vehicle employing a steering actuator that adjusts a steering torque applied to a steering wheel, the method comprises detecting a lane marking line on a driving lane of a host vehicle, based on a picture image in front of the host vehicle, determining, based on a detection result regarding the lane marking line, whether the host vehicle is in a first state $F_{LD}\neq0$ where there is an increased tendency for the host vehicle to deviate from the driving lane or in a second state $F_{LD}=0$ where there is a less tendency for the host vehicle to deviate from the driving lane, executing lane deviation prevention control by feedback-controlling the steering torque applied to the steering wheel so that the host vehicle's lane deviation tendency is avoided, when the host vehicle is in the first state $F_{LD}\neq0$, determining whether the host vehicle is in a third state Fdw≠0 where the host vehicle is traveling on predetermined irregularities formed on or close to the lane marking line, in a lane-marking non-detecting state where the lane marking line is out of an image pick-up enabling area, and executing, based on a detection result regarding whether the host vehicle is in the third state Fdw≠0 and the detection result regarding the lane marking line, vehicle yawing motion control by which the host vehicle returns to a central position of the driving lane, in the lane-marking non-detecting state.

The other objects and features of this invention will become understood from the following description with reference to the accompanying drawings.

DESCRIPTION OF THE PREFERRED EMBODIMENTS

Figure 1:
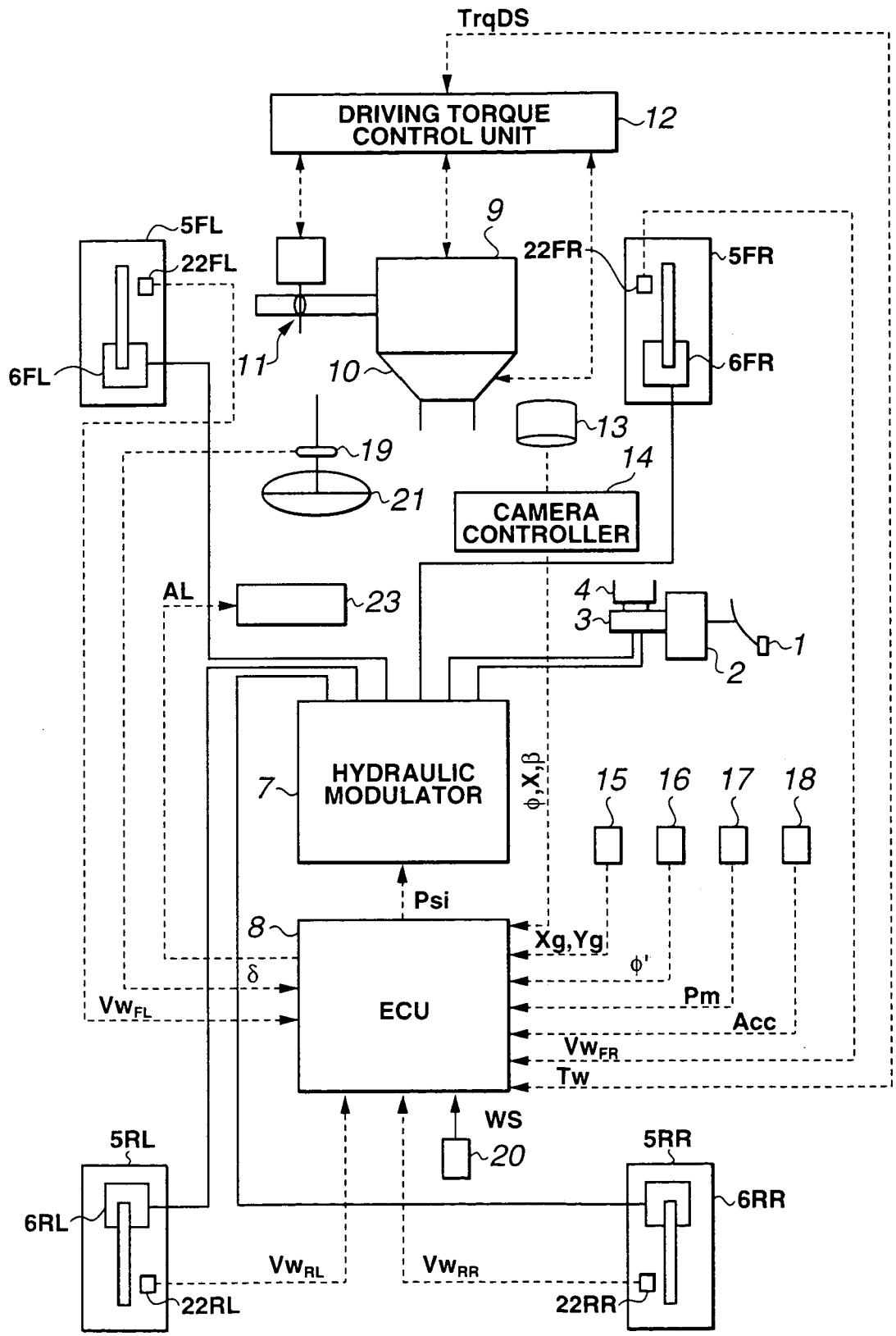
FIG. 1 is a system block diagram illustrating an embodiment of an automotive lane deviation prevention (LDP) apparatus.

Referring now to the drawings, particularly to FIG. 1, the lane deviation prevention (LDP) apparatus of the embodiment is exemplified in an adaptive cruise control (ACC) system equipped rear-wheel-drive vehicle employing an automatic transmission 10 and a rear differential. In the LDP apparatus of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators (braking force actuators) respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL-6RR in response to the command signal from the output interface of ECU 8, regardless of the braking action (brake-pedal depression) manually created by the driver's foot.

The ACC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The ACC system equipped rear-wheel-drive vehicle of the embodiment of FIG. 1 also includes a stereocamera with a charge-coupled device (CCD) image sensor, simply, a charge-coupled device (CCD) camera (a picture image pick-up device) 13 and a camera controller (serving as a lane marking line detector) 14 as an external recognizing sensor, which functions to detect the current position information of the ACC system equipped vehicle (the host vehicle) within the driving lane (the host vehicle's traffic lane) and whose sensor signal is used for detecting whether or not the host vehicle tends to deviate from the current driving lane. Within camera controller 14, on the basis of an image-processing picture image data in front of the host vehicle and captured by CCD camera 13, a lane marker or lane marking (or a white lane marking line by which two adjacent lanes are divided), such as a white line, is detected and thus the current host vehicle's traffic lane, exactly, the current position information of the host vehicle within the driving lane, is determined based on the white lane marking line detected. The processor of camera controller 14 calculates and determines or estimates, based on the image data from CCD camera 13 indicative of the picture image, a host vehicle's yaw angle $\phi$ with respect to the sense of the current host vehicle's driving lane, a host vehicle's lateral displacement or a host vehicle's lateral deviation X from a central axis (a reference axis) of the current host vehicle's driving lane, and a curvature $\beta$ of the current host vehicle's driving lane. The host vehicle's yaw angle φ means an angle between the sense of the current host vehicle's driving lane and the host vehicle's x-axis of a vehicle axis system (x, y, z). When the white lane marker or lane marking, such as a white line, in front of the host vehicle, cannot be recognized or detected by CCD camera 13, for instance, when the white lane markings are out of the image pick-up enabling area of CCD camera 13, or when the white lane marking has worn away, or when the lane markers or lane markings are partly covered by snow, it is impossible to recognize the lane markers or lane markings. In such a case, each of detection parameters, namely, the host vehicle's yaw angle φ, lateral displacement X, and curvature β is set to "0".

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters φ, X, and β calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor (G sensor) 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle, and/or to detect a vertical acceleration of a point of the vehicle suspension, moving up and down. Yaw rate sensor 16 is provided to detect a yaw rate φ' (one of the host vehicle's driving states) resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also to detect the direction indicated by the direction indicator, and to output a direction indicator switch signal WS. In addition to CCD camera 13 and camera controller 14, a radar controller using a radar sensor, such as a scanning laser radar sensor serving as an object detector, may be provided to more precisely capture, recognize, sense, or detect a preceding vehicle (or a relevant target vehicle), or a frontally located object, or a running vehicle on the adjacent lane. In such a case, in addition to the input informational data, namely the host vehicle's yaw angle φ, host vehicle's lateral displacement X, and curvature β, and information regarding whether or not the white lane marking, such as a white line, in front of the host vehicle, is recognized or captured by CCD camera 13 (in other words, a recognition signal or a decision signal regarding whether or not the white lane marking is detected by camera controller 14), additional input information, that is, a relative longitudinal distance Lx from the host vehicle to the preceding vehicle (or the frontally-located object), a relative lateral distance Ly from the host vehicle to the running vehicle on the adjacent lane (or the adjacently-located object), and a width Hs of the preceding vehicle or the frontally- or adjacently-located object can be detected or estimated and input into the input interface of ECU 8. Within the ACC system, these input informational data are used for collision avoidance control as well as lane deviation prevention control (or vehicle yawing motion control). The previously-noted CCD camera 13 and camera controller 14 and the radar controller function as an external recognizing detector or a lane marking line detector or a traveling-path condition detector, which detects a condition of the path where the host vehicle is traveling. In the presence of a directionality or polarity concerning left or right directions of each of the vehicle driving state indicative data and the traveling-path condition indicative data, namely, yaw rate φ', lateral acceleration Yg, steer angle δ, yaw angle φ, and lateral displacement X, a change in the vehicle driving state indicative data to the left is indicated as a positive value, while a change in the vehicle driving state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral displacement X is indicated as a positive value when the host vehicle is deviated from the central axis of the current driving lane to the left. Conversely when the host vehicle is deviated from the central axis of the current driving lane to the right, lateral displacement X is indicated as a negative value. The positive signal value of direction indicator switch signal WS from direction indicator switch 20 means a left turn (counterclockwise rotation of direction indicator switch 20), whereas the negative signal value of direction indicator switch signal WS means a right turn (clockwise rotation of direction indicator switch 20). ECU 8 is also connected to a warning system 23 having a warning buzzer and/or a warning light, which comes on in response to an alarm signal AL from ECU 8, so that a visual and/or audible warning is signaled to the driver. Within ECU 8, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations (described later in reference to FIG. 2 or 12), when there is a possibility of the host vehicle's lane deviation. Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
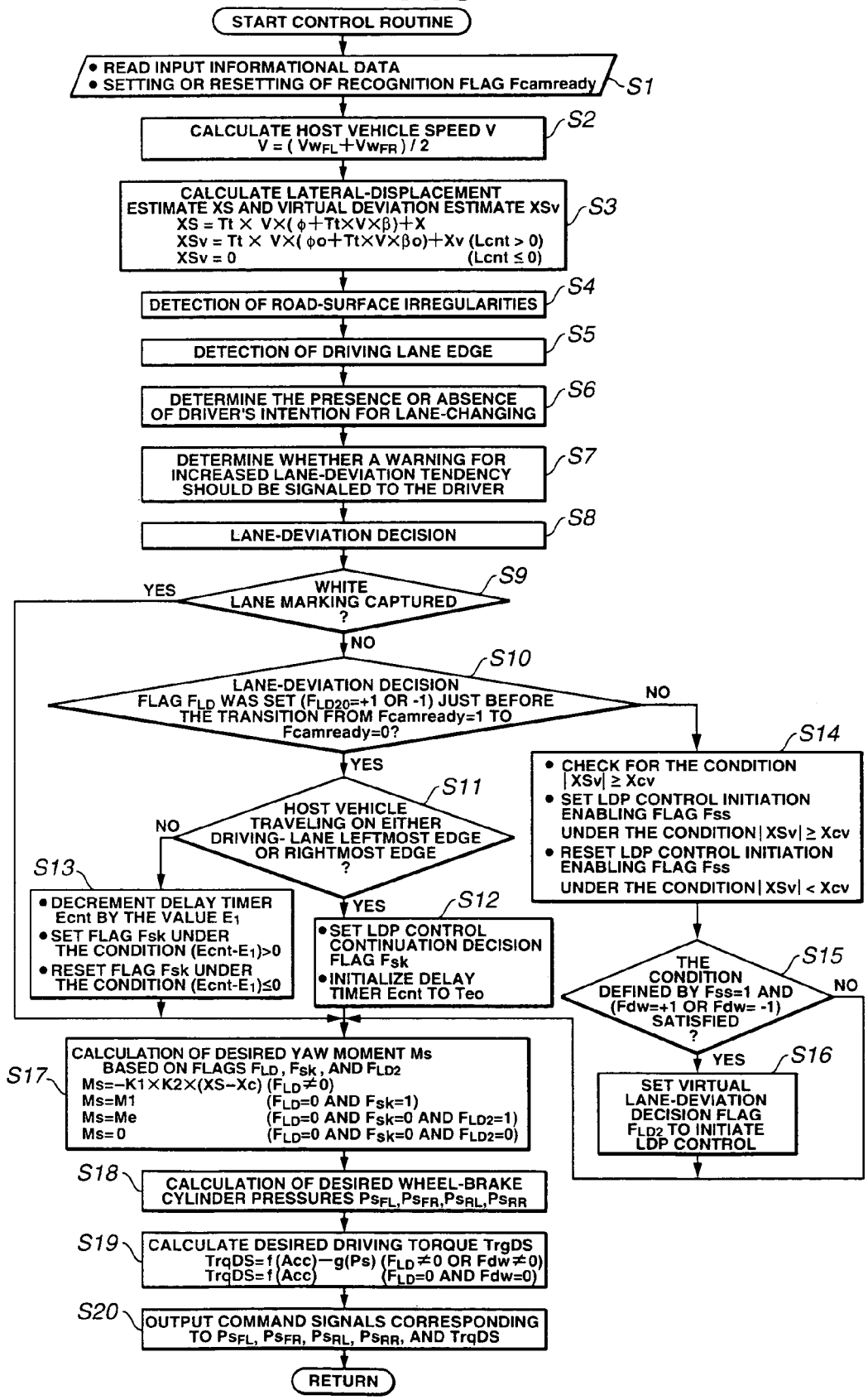
FIG. 2 is a flow chart showing a lane deviation prevention control routine executed by the LDP apparatus of the embodiment of FIG. 1.

The LDP control routine executed by ECU 8 incorporated in the automotive LDP apparatus of the embodiment shown in FIG. 1 is hereunder described in detail in reference to the flow chart shown in FIG. 2. The LDP control routine of FIG. 2 is executed as time-triggered interrupt routines to be triggered every predetermined sampling time intervals ΔT such as 20 milliseconds.

At step S1, input informational data from the previously-noted engine/vehicle switches and sensors, and driving-torque controller 12 and camera controller 14 are read. Concretely, read are engine/vehicle switch/sensor signal data, such as the host vehicle's longitudinal acceleration Xg, lateral acceleration Yg, yaw rate φ', wheel speeds Vwi ($Vw_{FL}$, $Vw_{FR}$, $Vw_{RL}$, $Vw_{RR}$), accelerator opening Acc, master-cylinder pressure Pm, steer angle δ, and direction indicator switch signal WS, and signal data from driving-torque control unit 12 such as driving torque Tw, and signal data from camera controller 14 such as the host vehicle's yaw angle φ with respect to the direction of the current host vehicle's driving lane, lateral displacement X from the central axis of the current host vehicle's driving lane, curvature β of the current driving lane, and the recognition signal regarding whether or not the white lane marking is detected by camera controller 14. The host vehicle's yaw angle φ may be calculated by integrating yaw rate φ' detected by yaw rate sensor 16. Additionally, at step S1, a check is made to determine whether or not the recognition signal from camera controller 14 indicates a state where the white lane marking line in front of the host vehicle is sufficiently satisfactorily detected. When the recognition signal from camera controller 14 indicates a state where the white lane marking line in front of the host vehicle is detected, a so-called recognition flag $F_{camready}$ is set to "1". Conversely when the recognition signal from camera controller 14 indicates a state where the white lane marking line in front of the host vehicle is not detected, recognition flag $F_{camready}$ is reset to "0". That is, $F_{camready}=1$ means a lane-marking detecting state, whereas $F_{camready}=0$ means a lane-marking non-detecting state.

At step S2, a host vehicle's speed V is calculated. Concretely, host vehicle speed V is calculated as a simple average value $(Vw_{FL}+Vw_{FR})/2$ of front-left and front-right wheel speeds $Vw_{FL}$ and $Vw_{FR}$ (corresponding to wheel speeds of driven road wheels 5FL and 5FR), from the expression $V=(Vw_{FL}+Vw_{FR})/2$. In lieu thereof, in case of an ABS system equipped vehicle, a pseudo vehicle speed used for skid control may be used as host vehicle speed V.

At step S3, a lateral-displacement estimate XS, in other words, an estimate of a future lateral deviation or an estimate of a future lateral displacement, is estimated or arithmetically calculated. Actually, lateral-displacement estimate XS is estimated or arithmetically calculated based on the latest up-to-date information concerning the host vehicle's yaw angle φ with respect to the direction of the current host vehicle's driving lane (in other words, the orientation of the host vehicle with respect to the direction of the current host vehicle's driving lane), lateral displacement X from the central axis of the current host vehicle's driving lane, curvature β of the current host vehicle's driving lane, and the host vehicle's speed V $(=(Vw_{FL}+Vw_{FR})/2)$, from the following expression (1).

$$XS=Tt\times V\times(\phi+Tt\times V\times\beta)+X \quad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as a future lateral-displacement estimate XS.

At the same time, at step S3, a check for the lane-marking detecting state or the lane-marking non-detecting state is made based on the state of recognition flag $F_{camready}$, calculated at the current execution cycle. When recognition flag $F_{camready}$, calculated at the current execution cycle, is set to "1", a count value of a lost counter (or a count-down timer) Lcnt is set to or kept at "0". Conversely when recognition flag $F_{camready}$, calculated at the current execution cycle, is reset to "0", another check is made to determine whether the current time period corresponds to a time period during which a transition $(F_{camready}=1 \rightarrow F_{camready}=0)$ from the lane-marking detecting state $(F_{camready}=1)$ to the lane-marking non-detecting state $(F_{camready}=0)$ has just occurred. Concretely, this check is made to determine whether recognition flag $F_{camready}$, calculated one cycle before, has been set to "1". When recognition flag $F_{camready}$, calculated one cycle before, has been set to "1" and additionally recognition flag $F_{camready}$, calculated at the current execution cycle, is reset to "0", and thus the transition $(F_{camready}=1 \rightarrow F_{camready}=0)$ from the lane-marking detecting state $(F_{camready}=1)$ to the lane-marking non-detecting state $(F_{camready}=0)$ has just occurred, the count value of lost counter Lcnt is set to an initial value Lcnt0, so as to initiate the count-down operation of lost counter Lcnt. The initial value Lcnt0 corresponds to a maximum count value. On the contrary, when recognition flag $F_{camready}$, calculated one cycle before, has been reset to "0" and additionally recognition flag $F_{camready}$, calculated at the current execution cycle, is reset to "0", and thus the transition $(F_{camready}=1 \rightarrow F_{camready}=0)$ from the lane-marking detecting state $(F_{camready}=1)$ to the lane-marking non-detecting state $(F_{camready}=0)$ has not occurred, the count value of lost counter Lcnt is calculated from the following expression (2).

$$Lcnt=\max(Lcnt-1,0) \quad (2)$$

where max(Lcnt−1, 0) means a select-HIGH process according to which a higher one of two values, namely Lcnt−1 and 0, is selected as the count value of lost counter Lcnt obtained at the current execution cycle, and Lcnt−1 means a value decremented from the count value of lost counter Lcnt, obtained one cycle before, by "1".

Figure 3:
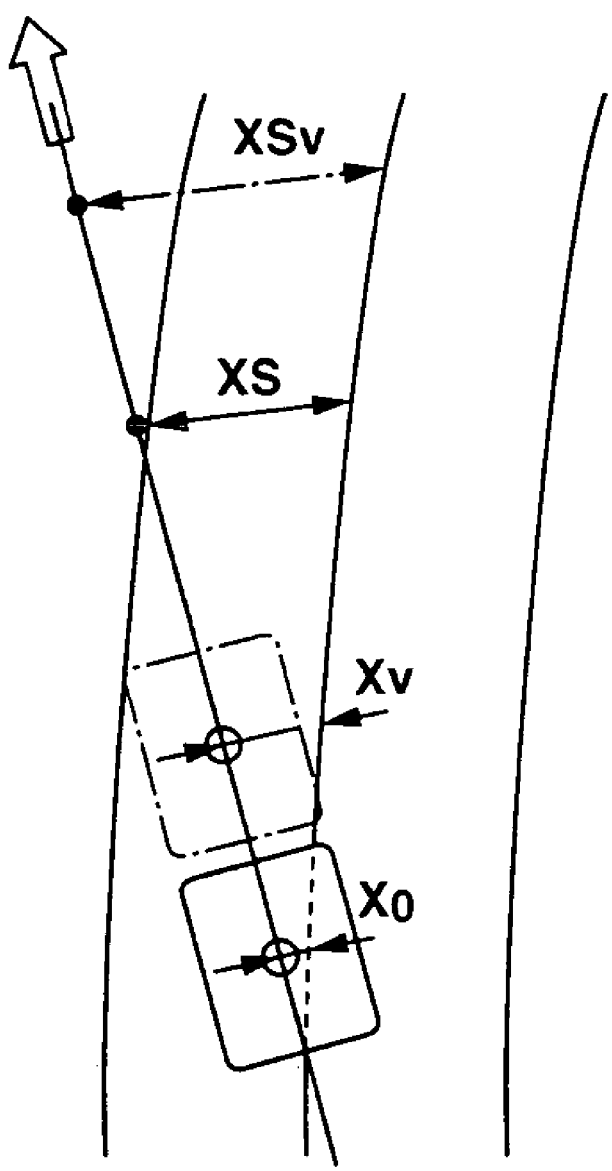
FIG. 3 is an explanatory view showing a virtual deviation estimate XSv.

Additionally, in the lane-marking non-detecting state $(F_{camready}=0)$, in other words, when recognition flag $F_{camready}$, calculated at the current execution cycle, is reset to "0", a further check is made to determine whether an elapsed time $T_{lost}$, measured from the point of time at which the transition $(F_{camready}=1 \rightarrow F_{camready}=0)$ from the lane-marking detecting state $(F_{camready}=1)$ to the lane-marking non-detecting state $(F_{camready}=0)$ has occurred, is sufficiently short (in other words, Lcnt>0, as discussed hereunder). Concretely, this check is made based on a comparison result between the current count value of lost counter Lcnt and a predetermined value "0". More concretely, a check is made to determine whether the current count value of lost counter Lcnt is greater than "0". The inequality Lcnt>0 means that the elapsed time $T_{lost}$, measured from the time point of the transition $(F_{camready}=1 \rightarrow F_{camready}=0)$ from the lane-marking detecting state $(F_{camready}=1)$ to the lane-marking non-detecting state $(F_{camready}=0)$, is still short. When Lcnt>0, virtual deviation estimate XSv is arithmetically calculated based on the computation results (φo, Xo, βo) of the host vehicle's yaw angle, the lateral displacement, and the curvature, all obtained just before the transition $(F_{camready}=1 \rightarrow F_{camready}=0)$ from the lane-marking detecting state $(F_{camready}=1)$ to the lane-marking non-detecting state $(F_{camready}=0)$, from the following expression (3). Conversely when Lcnt≦0, virtual deviation estimate XSv is set to "0".

$$XSv=Tt\times V\times(\phi o+Tt\times V\times\beta o)+Xv \quad (3)$$

where, as can be seen from FIG. 3, Xv means a lateral displacement from a virtual driving-lane center on the assumption that the angle (yaw angle φ) between the sense of the host vehicle's driving lane and the host vehicle's x-axis of the vehicle axis system (x, y, z) is fixed to the yaw angle φo, obtained just before the lane-marking detection state transition $(F_{camready}=1 \rightarrow F_{camready}=0)$ from $F_{camready}=1$ to $F_{camready}=0$, and additionally the curvature of the host vehicle's driving lane is fixed to the curvature βo, obtained just before the transition from $F_{camready}$=1 to $F_{camready}$=0.

The previously-noted lateral displacement Xv is arithmetically calculated based on the elapsed time $T_{lost}$, measured from the point of time at which the transition from $F_{camready}$=1 to $F_{camready}$=0 has occurred, from the following expression (4).

$$Xv = Xo - T_{lost} \times V \times (\phi o + T_{lost} \times V \times \beta o) \quad (4)$$

In other words, lateral displacement Xv corresponds to the summed value of (i) the host vehicle's lateral displacement Xo from the host vehicle's driving lane, obtained just before the transition from $F_{camready}$=1 to $F_{camready}$=0, and (ii) the estimate of lateral displacement of the host vehicle with respect to the host vehicle's driving-lane center, whose lateral-displacement estimate may increase as the previously-discussed elapsed time $T_{lost}$ increases.

As set out above, according to the LDP control system of the embodiment, only when the elapsed time $T_{lost}$, measured from the point of time at which the transition from the lane-marking detecting state ($F_{camready}$=1) to the lane-marking non-detecting state ($F_{camready}$=0) has occurred, is sufficiently short (that is, Lcnt>0), virtual deviation estimate XSv can be arithmetically calculated based on the computation results (φo Xo, βo) of the host vehicle's yaw angle, lateral displacement, and curvature, all obtained just before the transition from the lane-marking detecting state ($F_{camready}$=1) to the lane-marking non-detecting state ($F_{camready}$=0), from the expression XSv=Tt×V×(φo+Tt×V×βo)+Xv. Therefore, it is possible to properly calculate virtual deviation estimate XSv.

Figure 4A:
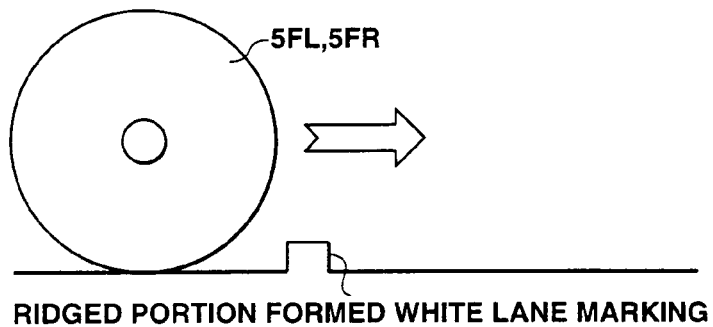
FIGS. 4A-4C are explanatory views showing wheel speed fluctuations and wheel acceleration fluctuations, occurring due to irregularities of the road surface.
Figure 4B:
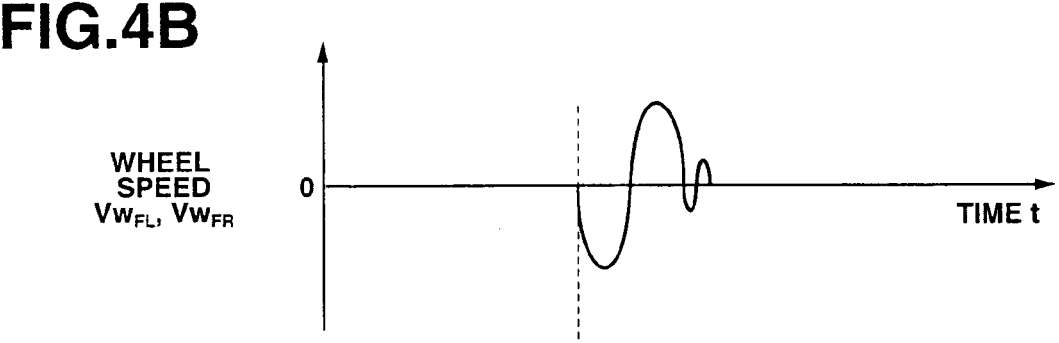
Figure 4C:
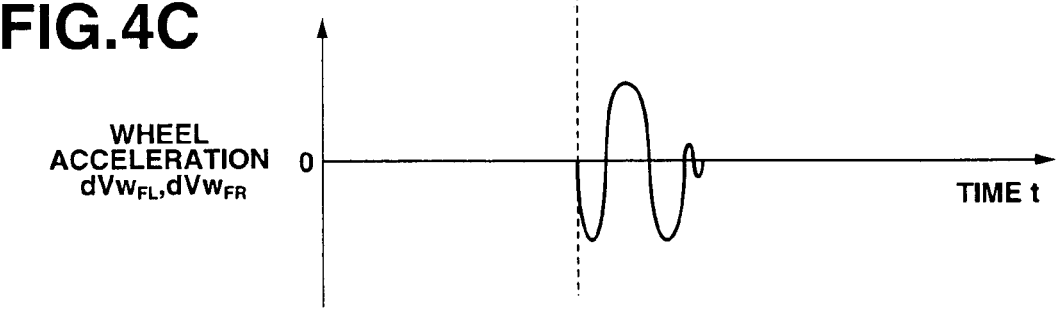

At step S4, a detection for predetermined road-surface irregularities, which are formed on the white lane marking line (the white lane marking), is made. In other words, a check is made to determine whether or not either one of front road wheels 5FL and 5FR of the host vehicle is traveling on predetermined road-surface irregularities, such as rumble strips, which are formed on the white lane marking. For instance, in order to warn or inform the driver of the lane-deviation tendency of the vehicle from the current driving lane, by way of rumble noise and/or vibratory motion input into the vehicle, such predetermined road-surface irregularities are generally equidistantly repeatedly formed on the white lane marking. As can be seen from the explanatory views of FIGS. 4A-4C, when either one of front road wheels 5FL and 5FR is traveling on the predetermined road-surface irregularities, equidistantly repeatedly formed on the white lane marking, front-left wheel speed $Vw_{FL}$ (or front-right wheel speed $Vw_{FR}$) tends to fluctuate at a substantially constant period or at a substantially constant oscillation frequency (see FIG. 4B). For the sake of simplicity, the presence of wheel speed fluctuations for only the front-left road wheel 5FL is hereinafter explained, because the arithmetic operations of step S4 are the same in the host vehicle's lane deviations to the left or to the right. That is, in order to detect or determine whether the host vehicle is traveling on the predetermined road-surface irregularities, a check is made to determine whether the front-left wheel speed $Vw_{FL}$ is fluctuating. Concretely, a front-left wheel acceleration/deceleration (simply, a front-left wheel acceleration) $dVw_{FL}$ is arithmetically calculated based on the latest up-to-date information concerning front-left wheel speed $Vw_{FL}$ read through step S1 from the following expression (5).

$$dVw_{FL} = Kg \times (Vw_{FL20} - Vw_{FL})/\Delta T \quad (5)$$

where $Vw_{FL20}$ denotes the previous value of front-left wheel speed $Vw_{FL}$, calculated one cycle before (i.e., 20 milliseconds before), Kg denotes a unit conversion factor, and ΔT denotes a predetermined sampling time interval such as 20 milliseconds.

Figure 5:
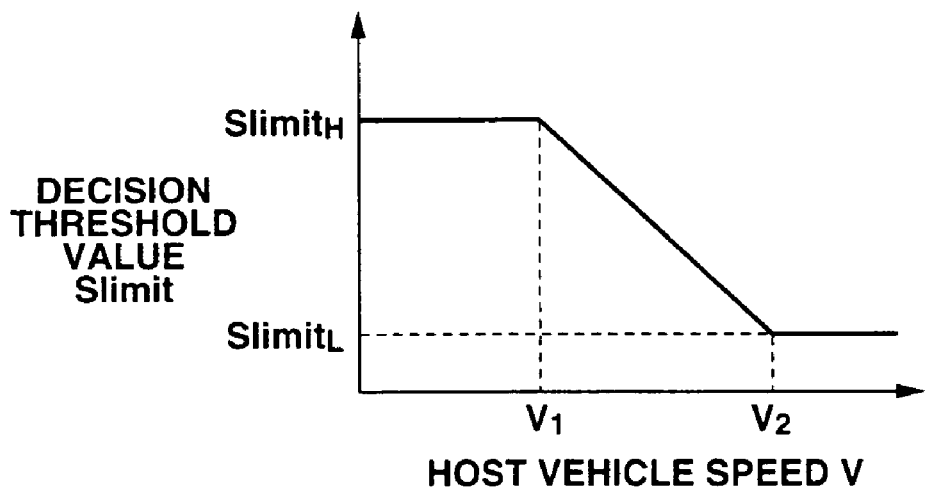
FIG. 5 is a predetermined host vehicle speed V versus decision threshold value $S_{limit}$ characteristic map used for the LDP control routine of FIG. 2.
Figure 6:
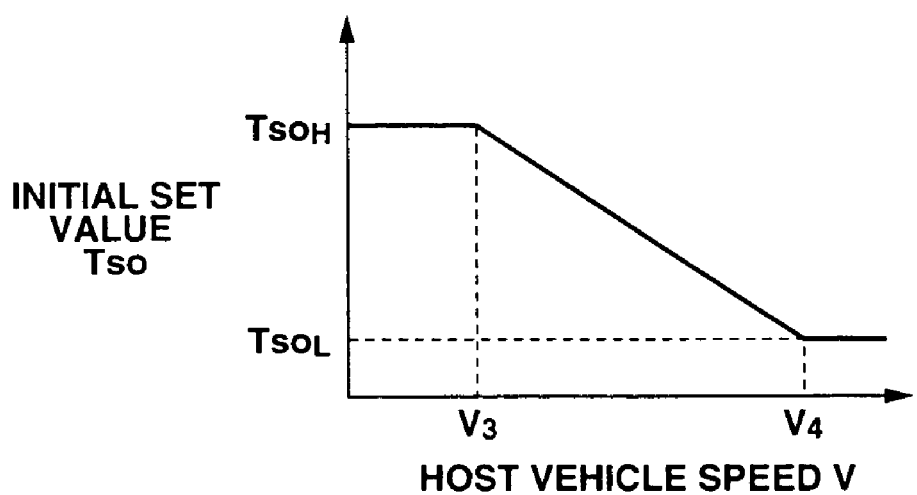
FIG. 6 is a predetermined host vehicle speed V versus initial set value $T_{SO}$ characteristic map used for the LDP control routine of FIG. 2.

At the same time, at step S4, a check is made to determine whether the calculated front-left wheel acceleration $dVw_{FL}$ becomes greater than a decision threshold value $S_{limit}$. When the calculated front-left wheel acceleration $dVw_{FL}$ becomes greater than decision threshold value $S_{limit}$, that is, when switching from the state defined by $dVw_{FL} \leq S_{limit}$ to the state defined by $dVw_{FL} > S_{limit}$ occurs, a further check is made to determine whether a predetermined time interval has expired from a time when front-left wheel speed $Vw_{FL}$ of front-left road wheel 5FL has been fluctuating one cycle before and thus the condition $dVw_{FL20} > S_{limit}$ has been satisfied. Actually, in the presence of switching from $dVw_{FL} \leq S_{limit}$ to $dVw_{FL} > S_{limit}$, as the further check, a count value $Ts_{FL}$ of a count-down timer is compared to a predetermined value TsL. At this time, if the count value $Ts_{FL}$ of the count-down timer is less than or equal to predetermined value TsL, that is, $Ts_{FL} \leq TsL$, the count value $Ts_{FL}$ of the count-down timer is set or initialized to an initial set value $T_{SO}$, and additionally a road-surface irregularities estimation starting flag (simply, a road-surface estimation starting flag) $Frs_{FL}$ is set to "1". In the system of the embodiment, for the reasons discussed below, decision threshold value $S_{limit}$ is arithmetically calculated or map-retrieved as a variable based on host vehicle speed V, from the predetermined host vehicle speed V versus decision threshold value $S_{limit}$ characteristic map of FIG. 5 showing how a decision threshold value $S_{limit}$ has to be varied relative to a host vehicle speed V. As can be appreciated from the preprogrammed characteristic map of FIG. 5 showing the relationship between host vehicle speed V and decision threshold value $S_{limit}$, in a low vehicle speed range ($0 \leq V \leq V_1$) from 0 to a predetermined vehicle speed value $V_1$, decision threshold value $S_{limit}$ is fixed to a predetermined maximum threshold value $S_{limitH}$. In a middle vehicle speed range ($V_1 < V \leq V_2$) from predetermined low vehicle speed $V_1$ to a predetermined high vehicle speed $V_2$ (higher than $V_1$), decision threshold value $S_{limit}$ gradually reduces to a predetermined minimum threshold value $S_{limitL}$, as the host vehicle speed V increases. In an excessively high vehicle speed range ($V_2 < V$) above predetermined high vehicle speed $V_2$, decision threshold value $S_{limit}$ is fixed to predetermined minimum threshold value $S_{limitL}$. On the other hand, initial set value $T_{SO}$ of the count-down timer is arithmetically calculated or map-retrieved as a variable based on host vehicle speed V, from the predetermined host vehicle speed V versus initial set value $T_{SO}$ characteristic map of FIG. 6 showing how an initial set value $T_{SO}$ of the count-down timer has to be varied relative to a host vehicle speed V. As can be appreciated from the preprogrammed characteristic map of FIG. 6 showing the relationship between host vehicle speed V and initial set value $T_{SO}$, in a low vehicle speed range ($0 \leq V \leq V_3$) from 0 to a predetermined vehicle speed value $V_3$, initial set value $T_{SO}$ of the count-down timer is fixed to a predetermined maximum initial set value $T_{SOH}$. In a middle vehicle speed range ($V_3 < V \leq V_4$) from predetermined low vehicle speed $V_3$ to a predetermined high vehicle speed $V_4$ (higher than $V_3$), initial set value $T_{SO}$ gradually reduces to a predetermined minimum initial set value $T_{SOL}$, as the host vehicle speed V increases. In an excessively high vehicle speed range ($V_4 < V$) above predetermined high vehicle speed $V_4$, initial set value $T_{SO}$ is fixed to predetermined minimum initial set value $T_{SOL}$.

This is because the period of fluctuations of front-left wheel acceleration $dVw_{FL}$ and the amplitude of fluctuations of front-left wheel acceleration $dVw_{FL}$, in other words, the period of fluctuations of front-left wheel speed $Vw_{FL}$ and the amplitude of fluctuations of front-left wheel speed $Vw_{FL}$, both vary depending on host vehicle speed V. For instance, when front-left road wheel 5FL is traveling on the ridged portions (see FIG. 4A) equidistantly repeatedly formed on the white lane marking at a comparatively low vehicle speed, remarkable fluctuations of front-left wheel speed $Vw_{FL}$ (or remarkable fluctuations of front-left wheel acceleration $dVw_{FL}$) occur for every ridge portions formed on the white lane marking. Conversely when front-left road wheel 5FL is traveling on the ridge portions formed on the white lane marking at a comparatively high vehicle speed, remarkable fluctuations of front-left wheel speed $Vw_{FL}$ (or remarkable fluctuations of front-left wheel acceleration $dVw_{FL}$) do not occur for every ridge portions formed on the white lane marking. That is to say, in case of high host vehicle speeds V, the host vehicle is greatly affected by the tire characteristics and suspension characteristics, and thus the period of fluctuations of front-left wheel speed $Vw_{FL}$ tends to increase, whereas the amplitude of fluctuations of front-left wheel speed $Vw_{FL}$ tends to decrease. For the reasons discussed above, on the basis of predetermined $V$-$S_{limit}$ characteristic of FIG. 5, decision threshold value $S_{limit}$ is fixed to predetermined maximum threshold value $S_{limitH}$ in the low vehicle speed range ($0 \leq V \leq V_1$), and fixed to predetermined minimum threshold value $S_{limitL}$ in the excessively high vehicle speed range ($V_2 < V$), and gradually reduces to predetermined minimum threshold value $S_{limitL}$ in a linear fashion as the host vehicle speed V increases in the middle vehicle speed range ($V_1 < V \leq V_2$). In a similar manner, on the basis of predetermined $V$-$T_{SO}$ characteristic of FIG. 6, count-down-timer initial set value $T_{SO}$ is fixed to predetermined maximum initial set value $T_{SOH}$ in the low vehicle speed range ($0 \leq V \leq V_3$), and fixed to predetermined minimum initial set value $T_{SOL}$ in the excessively high vehicle speed range ($V_4 < V$), and gradually reduces to predetermined minimum initial set value $T_{SOL}$ in a linear fashion as the host vehicle speed V increases in the middle vehicle speed range ($V_3 < V \leq V_4$).

Figure 7A:
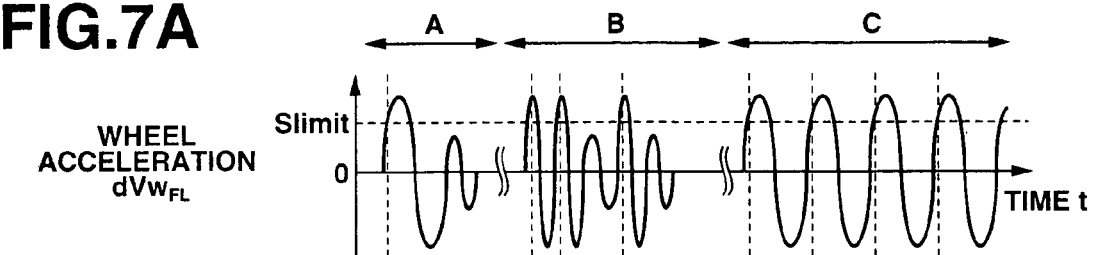
FIGS. 7A-7E are time charts explaining control actions performed by the apparatus of the embodiment executing the LDP control routine shown in FIG. 2.
Figure 7B:
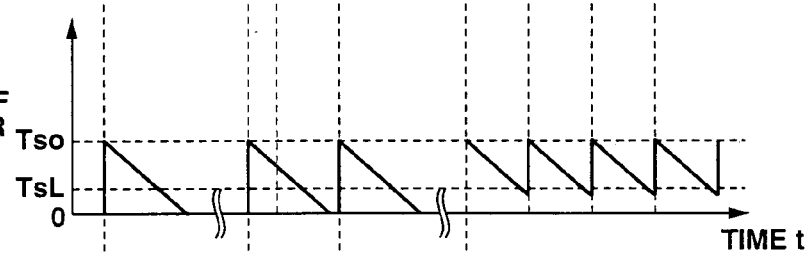
Figure 7C:
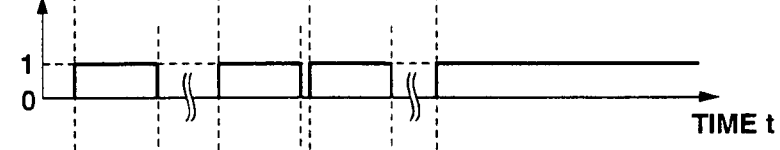
Figure 7D:
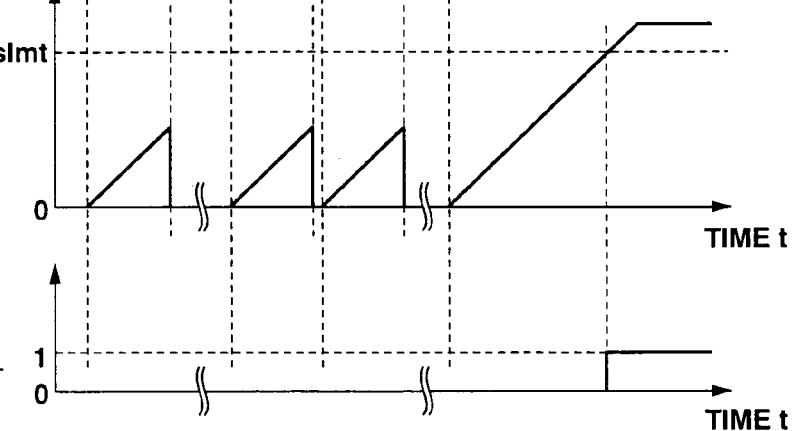
Figure 7E:
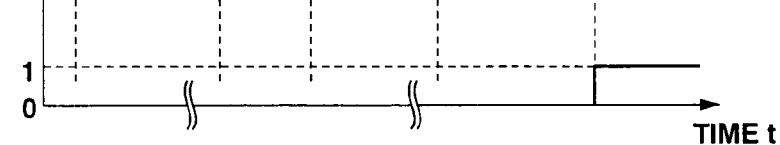

Conversely when the count value $Ts_{FL}$ of the count-down timer is greater than predetermined value TsL, the count value $TS_{FL}$ of the count-down timer is decremented by a predetermined value, while a count value $Trs_{FL}$ of a road-surface irregularities estimation timer is incremented by the predetermined value (see FIGS. 7B and 7D). If the count value $Ts_{FL}$ of the count-down timer is less than or equal to "0", road-surface estimation starting flag $Frs_{FL}$ is reset to "0" and additionally the count value $Trs_{FL}$ of the road-surface irregularities estimation timer is reset to "0".

Conversely when the current value $dVw_{FL}$ of front-left wheel acceleration, calculated at the current control cycle, is less than or equal to decision threshold value $S_{limit}$, that is, the condition $dVw_{FL} > S_{limit}$ is unsatisfied, or when the previous value $dVw_{FL20}$ of front-left wheel acceleration, calculated one cycle before, is greater than decision threshold value $S_{limit}$, that is, the condition $dVw_{FL20} > S_{limit}$ is satisfied, the count value $TS_{FL}$ of the count-down timer is decremented by the predetermined value, while the count value $Trs_{FL}$ of the road-surface irregularities estimation timer is incremented by the predetermined value. If the count value $Ts_{FL}$ of the count-down timer is less than or equal to "0", road-surface estimation starting flag $Frs_{FL}$ is reset to "0" and additionally the count value $Trs_{FL}$ of the road-surface irregularities estimation timer is reset to "0".

With the previously-noted arrangement, as can be seen from the time period C of each of the time charts of FIGS. 7A-7E, the count value $Ts_{FL}$ of the count-down timer is still less than or equal to predetermined value TsL when front-left wheel acceleration $dVw_{FL}$ becomes greater than decision threshold value $S_{limit}$ (see the time period C of the time chart of FIG. 7A) and thus the count value $Ts_{FL}$ of the count-down timer is initialized to initial set value $T_{SO}$ and then gradually decremented (see the time period C of the time chart of FIG. 7B). On the other hand, the count value $Trs_{FL}$ of the road-surface irregularities estimation timer is gradually incremented (see the time period C of the time chart of FIG. 7D). Thereafter, if front-left wheel acceleration $dVw_{FL}$ becomes greater than decision threshold value $S_{limit}$ again during a time interval from the time when the count value $Ts_{FL}$ of the count-down timer becomes less than or equal to predetermined value TsL to the time when the count value $Ts_{FL}$ of the count-down timer becomes less than or equal to "0", that is, when front-left wheel speed $Vw_{FL}$ tends to increase at a substantially constant time period ($T_{SO}$-TsL), the count value $Ts_{FL}$ of the count-down timer is set again to initial set value $T_{SO}$. As a result of this, as can be seen from the time period C of the time chart of FIG. 7D, the count value $Trs_{FL}$ of the road-surface irregularities estimation timer continues to increase (see the relationship between the road-surface estimation starting flag $Frs_{FL}$ and the count value $Trs_{FL}$ of the road-surface irregularities estimation timer in FIGS. 7C and 7D). On the contrary, as can be seen from the time periods A and B of each of the time charts of FIGS. 7A-7E, when the host vehicle momentarily stamps across an obstacle (e.g., a stone) fallen into the road surface or a protruding portion on the road and thus front-left wheel speed $Vw_{FL}$ temporarily greatly changes and fluctuates (see the time periods A and B of the time chart of FIG. 7A), the count value $Ts_{FL}$ of the count-down timer is temporarily set to initial set value $T_{SO}$, and then gradually reduces down to "0", and finally becomes "0" (see the time periods A and B of the time chart of FIG. 7B). As a result of this, the count value $Trs_{FL}$ of the road-surface irregularities estimation timer, gradually increasing, becomes "0" immediately when the count value $Ts_{FL}$ of the count-down timer becomes "0" (see the time periods A and B of each of the time charts of FIGS. 7B and 7D).

Thereafter, another check is made to determine whether the count value $Trs_{FL}$ of the road-surface irregularities estimation timer is greater than a predetermined decision threshold value Trslmt. When the count value $Trs_{FL}$ of the road-surface irregularities estimation timer is greater than a predetermined decision threshold value Trslmt ($Trs_{FL}$>Trslmt), a road-surface irregularities decision flag $Fot_{FL}$ is set to "1" (see the time period C of each of the time charts of FIGS. 7D and 7E). Setting of road-surface irregularities decision flag $Fot_{FL}$ to "1" means that front-left road wheel 5FL is now traveling on the predetermined irregularities (corresponding to the ridge portions exemplified in FIG. 4A) equidistantly repeatedly formed on the white lane marking. Conversely when the count value $Trs_{FL}$ of the road-surface irregularities estimation timer is less than or equal to predetermined decision threshold value Trslmt ($Trs_{FL} \leq$ Trslmt), road-surface irregularities decision flag $Fot_{FL}$ remains reset to "0" (see the time periods A and B of each of the time charts of FIGS. 7D and 7E).

As discussed previously, according to the LDP control system of the embodiment, when the front wheel speed $Vw_{FL}$ (or $Vw_{FR}$) of either one of front road wheels 5FL and 5FR is fluctuating or changing at a substantially constant time period ($T_{SO}$-TsL), road-surface irregularities decision flag $Fot_{FL}$ is set ($Fot_{FL}$=1). Therefore, only when either front-left road wheel 5FL or front-right road wheel 5FR is traveling on predetermined road-surface irregularities, which are equidistantly repeatedly formed on the white lane marking, the system determines that the host vehicle is running on the predetermined road-surface irregularities formed on the white lane marking. Suppose that road-surface irregularities decision flag $Fot_{FL}$ is set ($Fot_{FL}=1$) when the front wheel speed $Vw_{FL}$ (or $Vw_{FR}$) of the host vehicle is merely fluctuating but not changing at a substantially constant period ($T_{SO}$-TsL). In such a way to set the road-surface irregularities decision flag $Fot_{FL}$, even when the host vehicle merely stamps across a protruding portion on the road, road-surface irregularities decision flag $Fot_{FL}$ may be undesirably set to "1". As a result of this, there is a possibility that the system erroneously determines that the host vehicle is traveling on the predetermined road-surface irregularities formed on the white lane marking, in particular during the host vehicle's driving on bad roads such as rugged terrain.

At step S5, a first check is made to determine whether the host vehicle is traveling on either one of the leftmost and rightmost edges of the current driving lane. Concretely, a check is made to determine whether either one of road-surface irregularities decision flag $Fot_{FL}$ associated with front-left road wheel 5FL and road-surface irregularities decision flag $Fot_{FR}$ associated with front-right road wheel 5FR is set to "1". When either one of road-surface irregularities decision flag $Fot_{FL}$ for front-left road wheel 5FL and road-surface irregularities decision flag $Fot_{FR}$ for front-right road wheel 5FR is set to "1", a second check is made to determine whether road-surface irregularities decision flag $Fot_{FL}$ for front-left road wheel 5FL is set to "1". When the answer to the second check is in the affirmative, that is, either one of flags $Fot_{FL}$ and $Fot_{FR}$ is set to "1" and road-surface irregularities decision flag $Fot_{FL}$ for front-left road wheel 5FL is set (=1), a road-edge decision flag (or a driving-lane edge decision flag) Fdw is set to "1". Setting of road-edge decision flag Fdw to "1" (exactly, "+1") means that the host vehicle is now traveling on the left-hand edge of its driving lane. Conversely when the answer to the second check is in the negative, that is, either one of flags $Fot_{FL}$ and $Fot_{FR}$ is set to "1" and road-surface irregularities decision flag $Fot_{FR}$ for front-right road wheel 5FR is set (=1), road-end decision flag Fdw is set to "−1". Setting of road-end decision flag Fdw to "−1" means that the host vehicle is now traveling on the right-hand edge of its driving lane.

In contrast to the above, when road-surface irregularities decision flag $Fot_{FL}$ for front-left road wheel 5FL and road-surface irregularities decision flag $Fot_{FR}$ for front-right road wheel 5FR are both set to "1", or when flags $Fot_{FL}$ and $Fot_{FR}$ are both reset to "0", road-edge decision flag Fdw is reset to "0".

As explained previously, according to the system of the embodiment, only when either one of road-surface irregularities decision flag $Fot_{FL}$ for front-left road wheel 5FL and road-surface irregularities decision flag $Fot_{FR}$ for front-right road wheel 5FR is set to "1", road-edge decision flag Fdw is set (=+1 or −1). Thus, only when either one of front-left and front-right road wheels 5FL and 5FR of the host vehicle is traveling and stamping across the irregularities of the road surface, the system determines that the host vehicle is running on the predetermined road-surface irregularities, equidistantly repeatedly formed on the white lane marking.

At step S6, a check is made to determine, based on direction indicator switch signal WS from direction indicator switch 20 and steer angle δ detected by steer angle sensor 19, whether a driver's intention for lane changing is present or absent. Concretely, at step S6, a check is made to determine whether direction indicator switch 20 is turned ON. When direction indicator switch 20 is turned ON, a further check is made to determine whether the sign of direction indicator switch signal WS is identical to the sign of lateral-displacement estimate XS calculated through step S3. When the sign of direction indicator switch signal WS and the sign of lateral-displacement estimate XS are identical to each other, the processor of ECU 8 determines that the host vehicle is conditioned in the lane changing state, and thus a lane-changing indicative flag $F_{LC}$ is set to "1". Conversely when the sign of direction indicator switch signal WS and the sign of lateral-displacement estimate XS are not identical to each other, the processor of ECU 8 determines that the host vehicle is not conditioned in the lane changing state but there is an increased tendency of the host vehicle's lane deviation, and thus lane-changing indicative flag $F_{LC}$ is reset to "0". Actually, lane-changing indicative flag $F_{LC}$ is held at "1" for a predetermined time interval, such as four seconds, from the time when lane-changing indicative flag $F_{LC}$ has been set to "1" by turning the direction indicator switch 20 ON. This is because there is a possibility that direction indicator switch 20 is manually turned OFF during lane-changing and thus the LDP control may be engaged undesirably. More concretely, a check is made to determine whether direction indicator switch 20 has been switched from the turned-ON state to the turned-OFF state. When switching from the turned-ON state to turned-OFF state has occurred, ECU 8 determines that the current point of time corresponds to the time just after lane-changing operation, and thus a further check is made to determine whether the predetermined time interval, for example four seconds, measured or counted from the time when switching from the turned-ON state of direction indicator switch 20 to turned-OFF state has occurred, has expired. When the predetermined time interval (e.g., 4 seconds) has expired, lane-changing indicative flag $F_{LC}$ is reset to "0".

Taking into account the driver's steering operation under a condition that direction indicator switch 20 remains turned OFF, a still further check for the presence or absence of the driver's intention for lane changing is made based on steer angle δ and a variation Δδ in steer angle δ. Concretely, with direction indicator switch 20 turned OFF, a check is made to determine whether steer angle δ is greater than or equal to a predetermined steer angle $δ_s$ and additionally a variation Δδ in steer angle δ is greater than or equal to a predetermined change $Δδ_s$. In case of $δ≧δ_s$ and $Δδ≧Δδ_s$, ECU 8 determines that a driver's intention for lane changing is present, and thus lane-changing indicative flag $F_{LC}$ is set to "1". Conversely in case of $δ<δ_s$ or $Δδ<Δδ_s$, ECU 8 determines that a driver's intention for lane changing is absent, and thus lane-changing indicative flag $F_{LC}$ is reset to "0". Thereafter, the routine proceeds from step S6 to step S7 (described later). As discussed above, in the shown embodiment, the presence or absence of the driver's intention for lane changing is determined based on both of steer angle δ and its change Δδ. In lieu thereof, the presence or absence of the driver's intention for lane changing may be determined based on the magnitude of steering torque acting on the steering wheel.

At step S7, a check is made to determine, based on the absolute value |XS| of lateral-displacement estimate XS (exactly, a comparison result of lateral-displacement estimate absolute value |XS| and a predetermined alarm criterion $X_w$) and setting or resetting of lane-changing indicative flag $F_{LC}$, whether a visual and/or audible warning for the increased host vehicle's lane-deviation tendency should be signaled to the driver. Concretely, a check is made to determine whether lane-changing indicative flag $F_{LC}$ is reset to "0" and additionally the absolute value |XS| of lateral-displacement estimate XS is greater than or equal to predetermined alarm criterion $X_w$ (exactly, a predetermined alarm criterion threshold value). Predetermined alarm criterion $X_w$ is obtained by subtracting a predetermined margin $X_m$ (a predetermined constant) from a predetermined first lateral-displacement criterion $X_C$ (see the following expression (6)).

$$X_w = X_C - X_m \quad (6)$$

where first lateral-displacement criterion $X_C$ means a preset criterion threshold value of lateral displacement of the host vehicle from the central axis of the current host vehicle's driving lane, and predetermined margin $X_m$ corresponds to a margin from a time when warning system 23 has been switched to an operative state to a time when the LDP function has been engaged or enabled. For instance, first lateral-displacement criterion $X_C$ is set to 0.8 meter, since a width of a traffic lane of an express-highway in Japan is 3.35 meters. In case of $F_{LC}=0$ and $|XS| \geq X_w$, ECU 8 determines that the host vehicle is in a lane-deviation state where there is an increased tendency for the host vehicle to deviate from the current host vehicle's driving lane, and thus the output interface of ECU 8 generates alarm signal AL to warning system 23. On the contrary, in case of $F_{LC}=1$ or $|XS|<X_w$, ECU 8 determines that the host vehicle is out of the lane-deviation state, and thus another check is made to determine whether or not warning system 23 is in operation. During operation of warning system 23, another check is made to determine whether the absolute value $|XS|$ of lateral-displacement estimate XS is less than a difference $(X_w-X_h)$ between predetermined alarm criterion $X_w$ and a predetermined hysteresis $X_h$. Predetermined hysteresis $X_h$ is provided to avoid undesirable hunting for warning system 23. In case of $|XS|<(X_w-X_h)$, warning system 23 is deactivated by stopping the output of alarm signal AL to warning system 23. That is to say, until the lateral-displacement estimate XS is transferred to the state defined by $|XS|<(X_w-X_h)$ after warning system 23 has been activated, the warning operation of warning system 23 is continually executed. In the system of the shown embodiment, the visual and/or audible warning (the output of alarm signal AL to warning system 23) is dependent upon only the amount of lateral displacement (exactly, the absolute value $|XS|$ of lateral-displacement estimate XS), but not dependent upon virtual deviation estimate XSv. That is to say, for the purpose of simplification of the disclosure, virtual deviation estimate XSv is not taken into account as a necessary factor for the warning operation. In the LDP control system of the embodiment shown in FIGS. 1 and 2, first lateral-displacement criterion $X_C$ is fixed to a predetermined constant value. Actually, a lane width L of each of driving lanes is not fixed constant. Thus, first lateral-displacement criterion $X_C$ may be a variable, which is determined depending on lane width L of each of driving lanes. For instance, the lane width L itself can be obtained by image-processing the picture image data from CCD camera 13 or by extracting input information regarding the lane width of the current driving lane as map data, utilizing a navigation system. In this case, first lateral-displacement criterion $X_C$, which is a variable, can be calculated from the following expression (7).

$$X_C = \min\{(L/2 - Lc/2), 0.8\} \quad (7)$$

where Lc denotes a host vehicle's width and L denotes a lane width. As can be appreciated from the above expression (7), first lateral-displacement criterion $X_C$ is obtained as a lower one of the value (L/2−Lc/2) and 0.8 (unit: meter) by way of a so-called select-LOW process.

In lieu thereof, in case of an automated highway equipped with an infrastructure, a distance data (L/2−XS), which is obtained and received by way of mutual communication between the host vehicle and the on-road network (or the on-road sensor or the on-road lane marker) contained in the infrastructure, may be used as input information regarding an estimate of first lateral-displacement criterion $X_C$. Subsequently to step S7, step S8 occurs.

At step S8, the processor of ECU 8 makes a lane-deviation decision based on the picture image data concerning the white lane marking in front of the host vehicle, in other words, a comparison result between lateral-displacement estimate XS and first lateral-displacement criterion $X_C$, so as to determine whether there is a possibility or an increased tendency of lane deviation of the host vehicle from the current driving lane. Concretely, at step S8, a check is made to determine whether lateral-displacement estimate XS is greater than or equal to first lateral-displacement criterion $X_C$ (a positive lane-deviation criterion). In case of $XS \geq X_C$, the processor of ECU 8 determines that there is an increased tendency for the host vehicle to deviate from the current driving lane to the left, and thus a lane-deviation decision flag $F_{LD}$ is set to "+1". In case of $XS<X_C$, another check is made to determine whether lateral-displacement estimate XS is less than or equal to a negative value $-X_C$ of first lateral-displacement criterion $X_C$. In case of $XS \leq -X_C$, the processor of ECU 8 determines that there is an increased tendency for the host vehicle to deviate from the current driving lane to the right, and therefore lane-deviation decision flag $F_{LD}$ is set to "−1". Alternatively, when the condition defined by $XS \geq X_C$ and the condition defined by $XS \leq -X_C$ are both unsatisfied, that is, in case of $-X_C<XS<X_C$, the processor of ECU 8 determines that there is a less possibility of the host vehicle's lane deviation from the current driving lane to the right or to the left, and thus lane-deviation decision flag $F_{LD}$ is reset to "0".

Thereafter, a further check is made to determine whether lane-changing indicative flag $F_{LC}$ is set to "1". In case of $F_{LC}=1$, lane-deviation decision flag $F_{LD}$ is forcibly reset to "0", even under the condition defined by the inequality $|XS| \geq X_C$. In case of $F_{LC}=0$, a check is made to determine whether lane-deviation decision flag $F_{LD}$ is reset to "0". When lane-deviation decision flag $F_{LD}$ is reset ($F_{LD}=0$), an LDP control canceling flag or an LDP control inhibiting flag $F_{cancel}$ is reset to "0". In case of $F_{LD}=+1$ or −1, a check is made to determine whether the LDP control should be initiated. Actually, historical data of lateral-displacement estimate XS, calculated through step S3, are stored in predetermined memory addresses of the RAM of ECU 8. Then, the continuity or discontinuity of lateral-displacement estimate XS is determined based on the historical data of lateral-displacement estimate XS. Concretely, a check is made to determine whether the absolute value $|XS_{(n-1)} - XS_{(n)}|$ of the difference between the previous value $XS_{(n-1)}$ of lateral-displacement estimate XS and the current value $XS_{(n)}$ of lateral-displacement estimate XS is greater than or equal to a predetermined threshold value $L_{XS}$, which is provided to determine the continuity or discontinuity of lateral-displacement estimate XS. More concretely, in case of $F_{LD} \neq 0$ (i.e., $F_{LD}=+1$ or −1) and $|XS_{(n-1)} - XS_{(n)}| \geq L_{XS}$, ECU 8 determines that lateral-displacement estimate XS is discontinuous and thus LDP control inhibiting flag $F_{cancel}$ is set to "1". Conversely, in case of $|XS_{(n-1)} - XS_{(n)}| < L_{XS}$, ECU 8 determines that lateral-displacement estimate XS is continuous. LDP control inhibiting flag $F_{cancel}$ is reset to "0" when lane-deviation decision flag $F_{LD}$ is switched to "0". In other words, LDP control inhibiting flag $F_{cancel}$ is maintained at "0", until lane-deviation decision flag $F_{LD}$ is transferred from the set state of $F_{LD} \neq 0$ to the reset state of $F_{LD}=0$.

As discussed previously, in case of $F_{LC}=1$, lane-deviation decision flag $F_{LD}$ is forcibly reset to "0", even under the condition defined by the inequality $|XS| \geq X_C$. In a similar manner, when a tire grip on the road reaches a limit, in other words, during skid control, during traction control, or during vehicle dynamics control, the LDP control has to be generally inhibited. Thus, during skid control, during traction control, or during vehicle dynamics control, lane-deviation decision flag $F_{LD}$ is also forcibly reset to "0", even under the condition defined by the inequality $|XS| \geq X_C$. In the system of the shown embodiment, setting or resetting of lane-deviation decision flag $F_{LD}$ is based on only the amount of lateral displacement (exactly, the absolute value $|XS|$ of lateral-displacement estimate XS), but not based on virtual deviation estimate XSv. That is to say, in order to provide the simplified system, virtual deviation estimate XSv is not taken into account as a necessary factor for setting or resetting of lane-deviation decision flag $F_{LD}$.

As set forth above, according to the system of the embodiment, basically, under the condition defined by the inequality $|XS| \geq X_C$, lane-deviation decision flag $F_{LD}$ is switched to the set state, that is, $F_{LD}=+1$ (indicative of the host vehicle's lane-deviation tendency to the left) or $F_{LD}=-1$ (indicative of the host vehicle's lane-deviation tendency to the right). Thus, it is possible to properly precisely detect or determine whether there is an increased tendency for the host vehicle to deviate from the current driving lane.

At step S9, a check is made to determine whether camera controller 14 captures and recognizes or detects the white lane marking (the white lane line) in front of the host vehicle. Concretely, a check is made to determine whether or not recognition flag $F_{camready}$, determined through step S1, is set to "1". When recognition flag $F_{camready}$ is set (=1), the routine proceeds from step S9 to step S17. Conversely when recognition flag $F_{camready}$ is reset (=0), the routine proceeds from step S9 to step S10.

At step S10, a check is made to determine whether the LDP control was executed (the LDP function was engaged) just before the transition from the lane-marking detecting state ($F_{camready}=1$) to the lane-marking non-detecting state ($F_{camready}=0$). Concretely, a check is made to determine whether the previous value $F_{LD20}$ of lane-deviation decision flag $F_{LD}$ was set, that is, $F_{LD20}=+1$ (indicative of the host vehicle's lane-deviation tendency to the left) or $F_{LD20}=-1$ (indicative of the host vehicle's lane-deviation tendency to the right), just before the transition from the lane-marking detecting state ($F_{camready}=1$) to the lane-marking non-detecting state ($F_{camready}=0$). When the answer to step S10 is in the affirmative (YES), that is, when $F_{LD20}=+1$ or $F_{LD20}=-1$ just before the transition from $F_{camready}=1$ to $F_{camready}=0$, the routine proceeds from step S10 to step S11. Conversely when $F_{LD20}=0$ just before the transition from $F_{camready}=1$ to $F_{camready}=0$, the routine proceeds from step S10 to step S14.

At step S11, a check is made to determine whether the host vehicle is running on the predetermined road-surface irregularities (e.g., rumble strips), which are formed on the white lane marking of either one of leftmost and rightmost edges of the host vehicle's driving lane. Concretely, a check is made to determine whether road-edge decision flag Fdw, determined through step S5, is set to "+1" or "−1". When the answer to step S11 is affirmative (YES), that is, in case of Fdw≠0 (i.e., Fdw=+1 or Fdw=−1), the routine proceeds from step S11 to step S12. Conversely when the answer to step S11 is negative (NO), that is, in case of Fdw=0, the routine proceeds from step S11 to step S13.

At step S12, an LDP control continuation decision flag Fsk is set to "1", and thus the output of the controlled variable of LDP control is continued for a predetermined continuous time period, which is determined by means of a delay counter or a delay timer (a count-down timer) Ecnt (described later). At the same time, at step S12, the count value of delay timer Ecnt is initialized to an initial set value Teo. Thereafter, the routine proceeds from step S12 to step S17.

At step S13, the count value of delay timer Ecnt is decremented or subtracted by a predetermined value E1. Then, a check is made to determine whether the result of subtraction, that is, the difference (Ecnt−E1) is greater than "0". When (Ecnt−E1)>0, LDP control continuation decision flag Fsk is set to "1". Conversely when (Ecnt−E1)≦0, LDP control continuation decision flag Fsk is reset to "0". Thereafter, the routine flows from step S13 to step S17.

At step S14, the presence or absence of the host vehicle's lane-deviation tendency is virtually estimated based on the computation results (φo, Xo, βo) of the host vehicle's yaw angle, lateral displacement, and curvature, all obtained just before the transition from the lane-marking detecting state ($F_{camready}=1$) to the lane-marking non-detecting state ($F_{camready}=0$). Concretely, a check is made to determine whether the absolute value |XSv| of virtual deviation estimate XSv (calculated through step S3) is greater than or equal to a predetermined second lateral-displacement criterion $X_{CV}$. When the answer is affirmative, that is, in case of $|XSv| \geq X_{CV}$, an LDP control initiation enabling flag Fss is set to "1". The state of Fss=1 means that the processor of ECU 8 estimates or presumes that the host vehicle will deviate from the driving lane. Conversely when $|XSv| < X_{CV}$, LDP control initiation enabling flag Fss is reset to "0". In the shown embodiment, second lateral-displacement criterion $X_{CV}$ is fixed to a predetermined constant value. Generally, an error of virtual deviation estimate XSv is comparatively great. Thus, second lateral-displacement criterion $X_{CV}$ to be compared with the absolute value |XSv| of virtual deviation estimate XSv, is set to be smaller than first lateral-displacement criterion $X_C$ to be compared with the absolute value |XS| of lateral-displacement estimate XS. As discussed above, note that in the lane-marking non-detecting state ($F_{camready}=0$) the comparison result of virtual deviation estimate XSv and second lateral-displacement criterion $X_{CV}$ is effectively used through step S14 for estimation of the host vehicle's lane-deviation tendency, whereas in the lane-marking detecting state ($F_{camready}=1$) the comparison result of lateral-displacement estimate XS (calculated based the latest up-to-date picture image data from CCD camera 13 and camera control 14) and first lateral-displacement criterion $X_C$ is effectively used through step S8 for lane-deviation decision.

At step S15, a check is made to determine, based on the states of LDP control initiation enabling flag Fss and road-edge decision flag Fdw, whether the host vehicle's lane-deviation tendency has been estimated, and additionally the host vehicle is now traveling on the predetermined road-surface irregularities (e.g., rumble strips), formed on the white lane marking of either one of leftmost and rightmost edges of the host vehicle's driving lane. Concretely, a check is made to determine whether LDP control initiation enabling flag Fss, determined through step S14, is kept at the set state, that is, Fss=1, and additionally road-edge decision flag Fdw, determined through step S5, is kept at the set state, that is, Fdw=+1 or Fdw=−1. When the answer to step S15 is affirmative (YES), that is, Fss=1 and (Fdw=+1 or Fdw=−1), in other words, in case of (Fss=1 and Fdw=+1) or (Fss=1 and Fdw=−1), the routine proceeds from step S15 to step S16. Conversely when the answer to step S15 is negative (NO), that is, when the condition defined by Fss=1 and (Fdw=+1 or Fdw=−1) is unsatisfied, the routine proceeds from step S15 to step S17.

At step S16, in order to initiate the LDP control, a virtual lane-deviation decision flag $F_{LD2}$ is set to "1". That is, the state of $F_{LD2}=1$ means that initiation of LDP control has already been permitted. Thereafter, the routine proceeds from step S16 to step S17.

As discussed above, according to the system of the embodiment, when the first condition defined by Fss=1 and the second condition defined by Fdw=+1 or Fdw=−1 are both satisfied, in other words, when the host vehicle's lane-deviation tendency has been estimated from the condition defined by the inequality $|XSv| \geq X_{CV}$ and additionally the system detects that the host vehicle is now traveling on the predetermined road-surface irregularities (e.g., rumble strips), formed on the white lane marking of either one of leftmost and rightmost edges of the host vehicle's driving lane, virtual lane-deviation decision flag $F_{LD2}$ is set to "1". The way to set virtual lane-deviation decision flag $F_{LD2}$ to "1" based on both the first (Fss=1) and second (Fdw=+1 or Fdw=−1) conditions is superior to the way to set virtual lane-deviation decision flag $F_{LD2}$ to "1" based on only the second condition defined by Fdw=+1 or Fdw=−1, in a more precise starting point of LDP control.

At step S17, a desired yaw moment Ms is arithmetically calculated or derived, depending on the states of lane-deviation decision flag $F_{LD}$, LDP control continuation decision flag Fsk, and virtual lane-deviation decision flag $F_{LD2}$, as follows.

Figure 8:
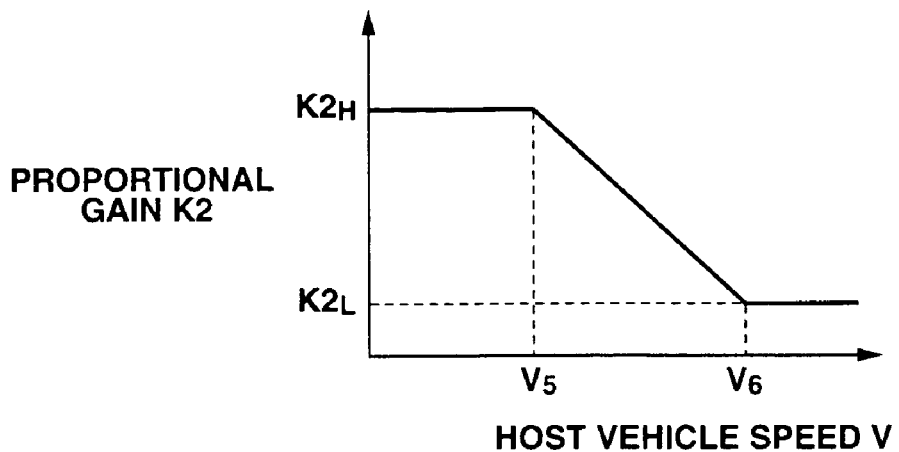
FIG. 8 is a predetermined host vehicle speed V versus proportional gain K2 characteristic map used for the LDP control routine of FIG. 2.

First, a check is made to determine whether lane-deviation decision flag $F_{LD}$ is kept at the set state ($F_{LD}$=+1 or −1), in other words, $F_{LD} \neq 0$. In case of $F_{LD} \neq 0$, that is, when the processor of ECU 8 determines that there is an increased tendency for the host vehicle to deviate from the driving lane, desired yaw moment Ms is arithmetically calculated from the following expression (8).

$$Ms = -K1 \times K2 \times (XS - X_C) \qquad (8)$$

where K1 denotes a proportional gain that is determined by specifications of the host vehicle, and K2 denotes a proportional gain that is determined by host vehicle speed V and retrieved based on the latest up-to-date informational data of host vehicle speed V from the predetermined host vehicle speed V versus proportional gain K2 characteristic map of FIG. 8 showing how a proportional gain K2 has to be varied relative to a host vehicle speed V. In the shown embodiment, as can be appreciated from the preprogrammed characteristic map of FIG. 8 showing the relationship between host vehicle speed V and proportional gain K2, in a low vehicle speed range ($0 \leq V \leq V_5$) from 0 to a predetermined vehicle speed value $V_5$, proportional gain K2 is fixed to a predetermined maximum gain $K2_H$. In a middle vehicle speed range ($V_5 < V \leq V_6$) from predetermined low vehicle speed $V_5$ to a predetermined high vehicle speed $V_6$ (higher than $V_5$), proportional gain K2 gradually reduces to a predetermined minimum gain $K2_L$, as the host vehicle speed V increases. In an excessively high vehicle speed range ($V_6 < V$) above predetermined high vehicle speed $V_6$, proportional gain K2 is fixed to predetermined minimum gain $K2_L$.

As discussed above, according to the system of the embodiment, when lane-deviation decision flag $F_{LD}$ is kept at the set state, that is, in case of $F_{LD} \neq 0$ (in other words, $F_{LD}$=+1 or −1), the system calculates desired yaw moment Ms based on the difference ($XS - X_C$) between lateral-displacement estimate XS and predetermined lateral-displacement criterion $X_C$. Thus, it is possible to produce a proper yaw moment, which is determined based on the difference ($XS - X_C$), thereby more certainly preventing the host vehicle from deviating from its driving lane.

Conversely in case of $F_{LD}=0$, a further check is made to determine whether LDP control continuation decision flag Fsk is set to "1". When $F_{LD}=0$ and Fsk=1, desired yaw moment Ms is set to a predetermined value M1 (see the following expression).

$$Ms = M1$$

where M1 denotes the desired yaw moment Ms20 calculated just before the transition from the lane-marking detecting state ($F_{camready}=1$) to the lane-marking non-detecting state ($F_{camready}=0$) and corresponding to the previous value Ms20 of desired yaw moment Ms calculated one cycle before (i.e., 20 milliseconds before).

Conversely when $F_{LD}=0$ and Fsk=0, a still further check is made to determine whether virtual lane-deviation decision flag $F_{LD2}$ is set to "1". When $F_{LD}=0$ and Fsk=0 and $F_{LD2}=1$, desired yaw moment Ms is fixed to a predetermined constant value Me (see the following expression).

$$Ms = Me$$

On the contrary, when $F_{LD}=0$ and Fsk=0 and $F_{LD2}=0$, desired yaw moment Ms is set to "0", that is, Ms=0.

At step S18, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Psi", are calculated based on master cylinder pressure Pm read through step S1 and desired yaw moment Ms determined through step S17.

Concretely, in case of $F_{LD}=0$ (whose lane-deviation decision flag $F_{LD}$ setting or resetting state is determined through step S3) and Fdw=0 (whose road-edge decision flag Fdw setting or resetting state is determined through step S5), that is, when there is a less tendency for the host vehicle to deviate from the driving lane and the host vehicle is not traveling on the predetermined road-surface irregularities, equidistantly repeatedly formed on the white lane marking, exactly, on the driving-lane leftmost edge or on the driving-lane rightmost edge, front-left and front-right desired wheel-brake cylinder pressures $Ps_{FL}$ and $Ps_{FR}$ for front wheel-brake cylinders 6FL and 6FR are set to master-cylinder pressure Pm (see the following expressions), whereas rear-left and rear-right desired wheel-brake cylinder pressures $Ps_{RL}$ and $Ps_{RR}$ for rear wheel-brake cylinders 6RL and 6RR are set to a rear-wheel brake pressure or a rear-wheel master-cylinder pressure PmR (see the following expressions), which is calculated and usually reduced from master-cylinder pressure Pm, while taking into account wheel-brake cylinder pressure distribution between front and rear wheel brakes.

$$Ps_{FL} = Pm$$

$$Ps_{FR} = Pm$$

$$Ps_{RL} = PmR$$

$$Ps_{RR} = PmR$$

In contrast to the above, during operation of the LDP control system (in case of $F_{LD} \neq 0$, that is, $F_{LD}$=+1 or $F_{LD}$=−1), or in the set state of road-edge decision flag Fdw (in case of Fdw$\neq$0, that is, Fdw=+1 or Fdw=−1), in other words, when there is an increased tendency for the host vehicle to deviate from the driving lane or when the host vehicle is traveling on either the driving-lane leftmost edge or the driving-lane rightmost edge, each of desired front and rear wheel-brake cylinder pressures $Ps_{FL}$, $Ps_{FR}$, $Ps_{RL}$ and $Ps_{RR}$ is calculated based on the magnitude of desired yaw moment Ms. Concretely, when the absolute value |Ms| of desired yaw moment Ms is less than a predetermined desired yaw-moment threshold value Ms1, (i.e., |Ms|<Ms1), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |Ms|<Ms1, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$$\Delta Ps_F = 0$$

$$\Delta Ps_R = 2 \times Kb_R \times |Ms|/T \quad (9)$$

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |MS| of desired yaw moment Ms is greater than or equal to predetermined threshold value Ms1, (i.e., |Ms|≦Ms1), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (10) and (11).

$$\Delta Ps_F = 2 \times Kb_F \times (|Ms| - Ms1)/T \quad (10)$$

$$\Delta Ps_R = 2 \times Kb_R \times Ms1/T \quad (11)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (10) and T of the expression (11) denote front and rear wheel treads being the same in front and rear wheels, and Ms1 denotes the predetermined desired yaw-moment threshold value.

In setting front and rear desired wheel-brake cylinder pressure differences $\Delta Ps_F$ and $\Delta Ps_R$ in case of |Ms|≧Ms1, the system of the embodiment actually determines both of the front and rear desired brake fluid pressure differences $\Delta Ps_F$ and $\Delta Ps_R$ based on the above expressions (10) and (11). Instead of producing the desired yaw-moment controlled variable needed for LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions.

$$\Delta Ps_R = 0$$

$$\Delta Ps_F = 2 \cdot Kb_F \cdot |Ms|/T$$

Therefore, when desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to master-cylinder pressure Pm, front-right desired wheel-brake cylinder pressure $Ps_{FR}$ is set to the sum (Pm+$\Delta Ps_F$) of master-cylinder pressure Pm and front desired wheel-brake cylinder pressure difference $\Delta Ps_F$, rear-left desired wheel-brake cylinder pressure $Ps_{RL}$ is set to rear-wheel master-cylinder pressure PmR, and rear-right desired wheel-brake cylinder pressure $Ps_{RR}$ is set to the sum (PmR+$\Delta Ps_R$) of rear-wheel master-cylinder pressure PmR and rear desired wheel-brake cylinder pressure difference $\Delta Ps_R$ (see the following expression (12)).

$$Ps_{FL} = Pm$$

$$Ps_{FR} = Pm + \Delta Ps_F$$

$$Ps_{RL} = PmR$$

$$Ps_{RR} = PmR + \Delta Ps_R \quad (12)$$

On the contrary, when desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum (Pm+$\Delta Ps_F$) of master-cylinder pressure Pm and front desired wheel-brake cylinder pressure difference $\Delta Ps_F$, front-right desired wheel-brake cylinder pressure $Ps_{FR}$ is set to master-cylinder pressure Pm, rear-left desired wheel-brake cylinder pressure $Ps_{RL}$ is set to the sum (PmR+$\Delta Ps_R$) of rear-wheel master-cylinder pressure PmR and rear desired wheel-brake cylinder pressure difference $\Delta Ps_R$, and rear-right desired wheel-brake cylinder pressure $Ps_{RR}$ is set to rear-wheel master-cylinder pressure PmR (see the following expression (13)).

$$Ps_{FL} = Pm + \Delta Ps_F$$

$$Ps_{FR} = Pm$$

$$Ps_{RL} = PmR + \Delta Ps_R$$

$$Ps_{RR} = PmR \quad (13)$$

In this manner, the system of the embodiment can properly calculate each of desired front and rear wheel-brake cylinder pressures $Ps_{FL}$, $Ps_{FR}$, $Ps_{RL}$ and $Ps_{RR}$ so as to produce desired yaw moment Ms, and thus the LDP control can be executed based on the proper desired front and rear wheel-brake cylinder pressures, irrespective of any driver's manual steering action.

Thereafter, at step S19, a desired driving torque TrqDS is arithmetically calculated as detailed hereunder, under a particular condition where there is a possibility that the host vehicle tends to deviate from the current driving lane and the LDP control is operative ($F_{LD} \neq 0$). In the shown embodiment, under the specified condition defined by $F_{LD} \neq 0$ (i.e., $F_{LD} = +1$ or $F_{LD} = -1$) or Fdw≠0 (i.e., Fdw=+1 or Fdw=−1), that is, when the LDP control system is in operation, vehicle acceleration is reduced or suppressed by decreasingly compensating for the engine output even when the accelerator pedal is depressed by the driver. Concretely, in case of $F_{LD} \neq 0$ or Fdw≠0, desired driving torque TrqDS is calculated from the following expression.

$$TrqDS = f(Acc) - g(Ps)$$

where f(Acc) is a function of accelerator opening Acc read through step S1 and the function f(Acc) is provided to calculate a desired driving torque that is determined based on the accelerator opening Acc and required to accelerate the host vehicle, and g(Ps) is a function of a sum Ps (=$\Delta Ps_F + \Delta Ps_R$) of front and rear desired wheel-brake cylinder pressure differences $\Delta Ps_F$ and $\Delta Ps_R$ to be produced during the yaw moment control (LDP control or vehicle yawing motion control), and the function g(Ps) is provided to calculate a desired braking torque that is determined based on the summed desired wheel-brake cylinder pressure differences Ps (=$\Delta Ps_F+\Delta Ps_R$).

Therefore, when the condition defined by $F_{LD}\neq 0$ (that is, $F_{LD}$=+1 or −1) or Fdw≠0 (that is, Fdw=1 or −1) is satisfied, and thus the LDP control is executed, the engine torque output is reduced by the braking torque created based on the summed desired wheel-brake cylinder pressure differences Ps (=$\Delta Ps_F+\Delta Ps_R$).

On the contrary, when the condition defined by $F_{LD}$=0 and Fdw=0 is satisfied, or when the condition defined by $F_{LD}$=0 and $F_{cancel}$=1 is satisfied, desired driving torque TrqDS is determined based on only the driving torque component needed to accelerate the host vehicle (see the following expression).

$$TrqDS=f(Acc)$$

In the shown embodiment, a higher priority is put on the controlled variable of LDP control rather than the manipulated variable of the accelerator pedal by the driver. In lieu thereof, it will be appreciated that the invention is not limited to the particular embodiment shown and described herein, but a higher priority may be put on the manipulated variable of the accelerator pedal by the driver rather than the controlled variable of LDP control, such that the absolute value |MS| of desired yaw moment Ms decreases, as the accelerator opening Acc increases. Subsequently to step S19, step S20 occurs.

At step S20, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S18, are output from the input interface of ECU 8 to hydraulic modulator 7 (serving as a yawing motion control actuator), and at the same time a command signal corresponding to desired driving torque TrqDS, calculated through step S19, is output from the output interface of ECU 8 to driving torque control unit 12. In this manner, one cycle of the time-triggered interrupt routine (the yaw moment control routine or the LDP control routine executed by the system of the embodiment) terminates and the predetermined main program is returned.

The automotive LDP apparatus of the embodiment executing the LDP control routine shown in FIG. 2 operates as follows.

Suppose that the host vehicle tends to deviate from the current driving lane to the left owing to the driver's inattentive driving. Under these conditions, within the processor of ECU 8, first, input informational data from the previously-noted engine/vehicle switches and sensors, and driving-torque controller 12 and camera controller 14 are read (see step S1 of FIG. 2). Recognition flag $F_{camready}$ is set to "1", since the white lane marking in front of the host vehicle is satisfactorily detected and captured by CCD camera 13. Thereafter, at step S2, host vehicle speed V is calculated from the expression V=($Vw_{FL}+Vw_{FR}$)/2. At step S3, lateral-displacement estimate XS is calculated from the expression XS=Tt×V×($\phi$+Tt× V×$\beta$)+X. Due to the host vehicle's lane deviation tendency gradually increasing, the calculated lateral-displacement estimate XS becomes greater than predetermined lateral-displacement criterion $X_C$. On the other hand, under the condition of $F_{camready}$=1, the count value of lost counter Lcnt is set to "0". After this, at step S4, front-left and front-right wheel accelerations $dVw_{FL}$ and $dVw_{FR}$ are arithmetically calculated based on the latest up-to-date information concerning front-left and front-right wheel speeds $Vw_{FL}$. On the basis of the calculated front-left and front-right wheel accelerations $dVw_{FL}$ and $dVw_{FR}$, road-surface irregularities decision flag $Fot_{FL}$ for front-left road wheel 5FL and road-surface irregularities decision flag $Fot_{FR}$ for front-right road wheel 5FR are reset to "0". At step S5, on the basis of road-surface irregularities decision flags $Fot_{FL}$ and $Fot_{FR}$ both reset, road-edge decision flag Fdw is also reset to "0". At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, the processor of ECU 8 determines that there is an increased tendency for the host vehicle to deviate from the current driving lane to the left, owing to the condition of XS≧$X_C$. Thus, lane-deviation decision flag $F_{LD}$ is set to "+1". Under these conditions, that is, with recognition flag $F_{camready}$ set (=1) the answer to step S9 becomes affirmative (YES). Therefore, the routine jumps from step S9 to step S17. Through step S17, desired yaw moment Ms (a negative yaw moment value) is calculated, based on the difference (XS−$X_C$) between lateral-displacement estimate XS and predetermined lateral-displacement criterion $X_C$, from the expression (8), i.e., Ms=−K1×K2× (XS−$X_C$), such that a yaw moment is produced in a direction (in a right direction) that the host vehicle's lane-deviation tendency is avoided. At step S18, on the basis of the calculated desired yaw moment Ms (the negative value, that is, −K1× K2×(XS−$X_C$)), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (12)). Thereafter, the routine advances via step S19 to step S20. At step S20, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S18, are output from the input interface of ECU 8 to hydraulic modulator 7. As a result (see the flow from step S1 through steps S2-S8 and S9 to steps S17-S20), a proper yaw moment tending to rotate the host vehicle to the right can be created, thus effectively preventing the host vehicle from deviating from the driving lane to the left.

Figure 9:
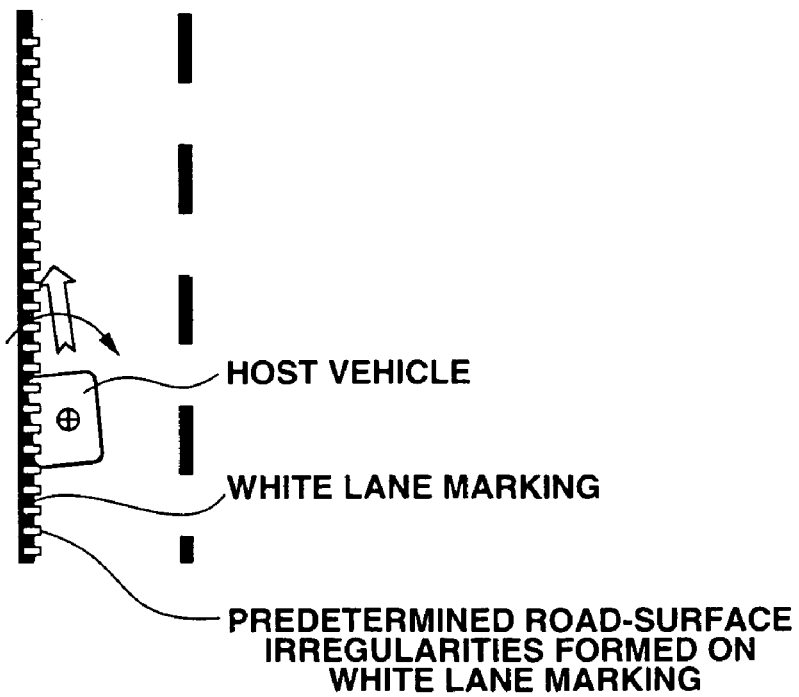
FIG. 9 is an explanatory view showing control actions performed by the apparatus of the embodiment executing the LDP control routine shown in FIG. 2.
Figure 10:
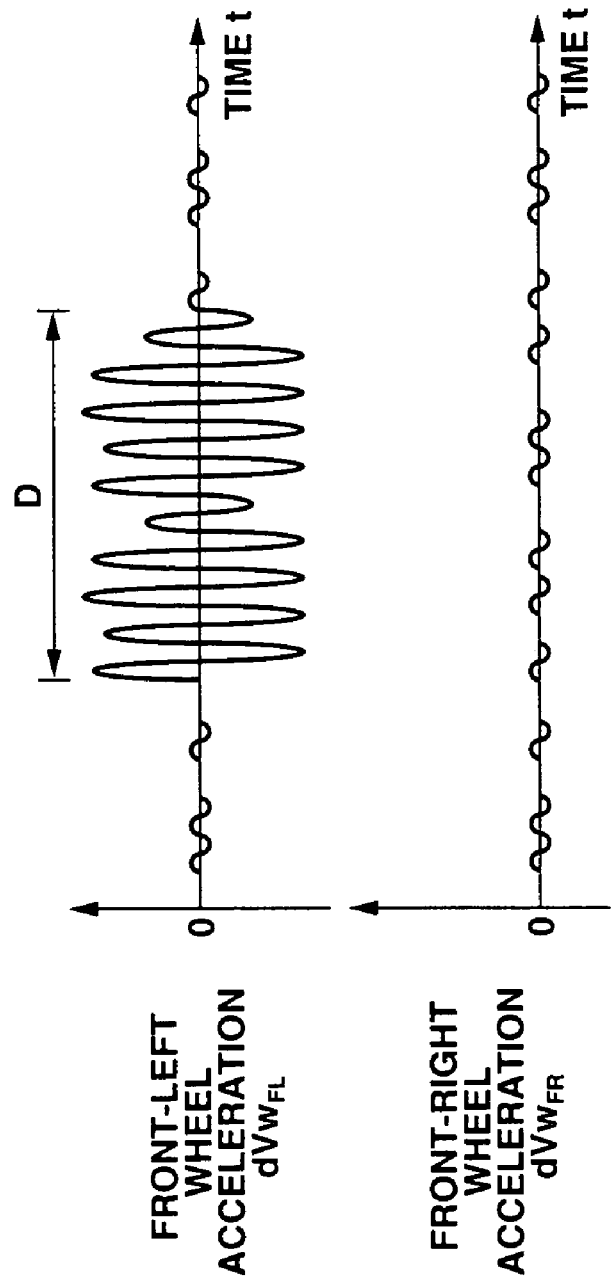
FIGS. 10A-10B are time charts respectively showing variations in front-left wheel acceleration/deceleration and variations in front-right wheel acceleration/deceleration.

Thereafter, during subsequent executions of the LDP control routine of FIG. 2, suppose that front-left road wheel 5FL of the host vehicle begins to travel on predetermined road-surface irregularities, equidistantly repeatedly formed on the white lane marking (the white lane marking line) of the left-hand edge of the host vehicle's driving lane (see FIG. 9), and additionally there is a transition from a state ($F_{camready}$=1) where a white lane marking exists within the image pick-up enabling area of CCD camera 13 to a state ($F_{camready}$=0) where the white lane marking exists outside of the image pick-up enabling area of CCD camera 13 and thus it is impossible to detect the white lane marking from the picture image data captured by CCD camera 13. In such a case, it is impossible to detect or determine the host vehicle's lane-deviation tendency, from the CCD-camera picture image data. Under these conditions, as explained hereunder, the routine flows from step S1 through steps S2-S8 and S9-S12 to steps S17-S20. Within the processor of ECU 8, first, input informational data from the previously-noted engine/vehicle switches and sensors, and driving-torque controller 12 and camera controller 14 are read (see step S1 of FIG. 2). As shown in the time period D of the time chart of FIG. 10A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{SO}$-TsL), is read or detected. In this case, of the picture image data, the host vehicle's yaw angle $\phi$, lateral displacement X, and curvature $\beta$ are all set to "0". Recognition flag $F_{camready}$ is reset to "0", since the white lane marking in front of the host vehicle cannot be captured by CCD camera 13 due to the transition from the lane-marking detecting state ($F_{camready}=1$) to the lane-marking non-detecting state ($F_{camready}=0$). At step S2, host vehicle speed V ($=(Vw_{FL}+Vw_{FR})/2$) is calculated. At step S3, lateral-displacement estimate XS is set to "0", because of $\phi=0$, $X=0$, and $\beta=0$. On the other hand, the count value of lost counter Lcnt is set to initial value Lcnt0 (>0), because of the presence of the transition from the lane-marking detecting state ($F_{camready}=1$) to the lane-marking non-detecting state ($F_{camready}=0$). Owing to the positive count value of lost counter Lcnt (Lcnt>0), virtual deviation estimate XSv is calculated based on the computation results ($\phi o$, $Xo$, $\beta o$) of the host vehicle's yaw angle, lateral displacement, and curvature, all obtained just before the transition from the lane-marking detecting state ($F_{camready}=1$) to the lane-marking non-detecting state ($F_{camready}=0$), from the expression $XSv=Tt \times V \times (\phi o+Tt \times V \times \beta o)+Xv$. At step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, on the basis of the value of lateral-displacement estimate XS (=0), lane-deviation decision flag $F_{LD}$ is switched from the set state ($F_{LD20}=+1$) to the reset state ($F_{LD}=0$), owing to XS=0, i.e., $-X_C<XS(=0)<X_C$. Under these conditions, the answer to step S9 becomes negative (NO), because of $F_{camready}=0$. Additionally, the answer to step S10 becomes affirmative (YES), since the previous value $F_{LD20}$ of lane-deviation decision flag $F_{LD}$ was "+1" just before the transition from the lane-marking detecting state ($F_{camready}=1$) to the lane-marking non-detecting state ($F_{camready}=0$). On the other hand, the answer to step S11 becomes affirmative (YES), because of Fdw=+1. Therefore, the routine advances from step S9 through steps S10-S11 to step S12 and thus LDP control continuation decision flag Fsk is set to "1" and additionally the count value of delay timer Ecnt is initialized to initial set value Teo. Thus, under the condition of $F_{LD}=0$ and Fsk=1, through step S17, desired yaw moment Ms is set to predetermined value M1, that is, Ms=M1=Ms20 (calculated just before the transition from the lane-marking detecting state ($F_{camready}=1$) to the lane-marking non-detecting state ($F_{camready}=0$) and corresponding to the previous yaw-moment value Ms20 calculated one cycle before (i.e., 20 milliseconds before), so that the controlled variable of LDP control remains unchanged. At step S18, on the basis of the calculated desired yaw moment Ms, in other words, the previous yaw-moment value Ms20 (=M1), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (12)). Thereafter, the routine advances via step S19 to step S20. At step S20, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S18, are output from the input interface of ECU 8 to hydraulic modulator 7. As a result (see the flow from step S1 through steps S2-S8 and S9-S12 to steps S17-S20), according to the same controlled variable of LDP control as the previous execution cycle, a properly-controlled actual yawing moment can be created, thus enabling the host vehicle to return to the central position of the driving lane by way of the vehicle yawing motion control and consequently avoiding the host vehicle from deviating from the driving lane.

As set forth above, according to the system of the embodiment executing the LDP control routine of FIG. 2, if the LDP control system determines that the host vehicle is running on the predetermined road-surface irregularities formed on the white lane marking and therefore the host vehicle has an increased lane-deviation tendency, even when, during execution of the LDP control, there is a transition from a state ($F_{camready}=1$) where a white lane marking exists within the image pick-up enabling area of CCD camera 13 to a state ($F_{camready}=0$) where the white lane marking exists outside of the image pick-up enabling area of CCD camera 13 and thus it is impossible to detect the white lane marking from the picture image data captured by CCD camera 13, the current value of the controlled variable of LDP control is maintained at the previous controlled variable, that is, the previous desired yaw moment MS20, calculated one execution cycle before. Thus, desired wheel-brake cylinder pressures $Ps_{FL}$, $Ps_{FR}$, $Ps_{RL}$ and $Ps_{RR}$, are also maintained at the previous pressure values. As a result, in accordance with the same controlled variable of LDP control as the previous execution cycle, a properly-controlled actual yawing moment can be continuously created and maintained, without suspending or disabling the lane deviation prevention function. Therefore, the LDP apparatus of the embodiment can enhance the LDP control performance even when there is an increased tendency for the host vehicle to deviate from the driving lane in presence of a transition from a state ($F_{camready}=1$) where a white lane marking exists within the image pick-up enabling area of CCD camera 13 to a state ($F_{camready}=0$) where the white lane marking exists outside of the image pick-up enabling area of CCD camera 13. In addition, in the LDP apparatus of the embodiment, the yawing moment, produced by way of the LDP control, can be continuously exerted on the host vehicle for a predetermined time period even in presence of a transition from the lane-marking detecting state ($F_{camready}=1$) where the white lane marking exists within the image pick-up enabling area of CCD camera 13 to the lane-marking non-detecting state ($F_{camready}=0$) where the white lane marking exists outside of the image pick-up enabling area of CCD camera 13 and thus it is impossible to detect the white lane marking from the picture image data captured by CCD camera 13. Therefore, the host vehicle's dynamic behavior (the yawing motion of the host vehicle) can be optimized by properly adjusting proportional gain K1. For example, setting proportional gain K1 to a comparatively small value ensures a more smooth host vehicle's dynamic behavior. In contrast to the above, hitherto, the LDP function was temporarily disengaged or disabled or suspended in presence of a transition from a lane-marking detecting state ($F_{camready}=1$) where a white lane marking exists within the image pick-up enabling area of CCD camera 13 to a lane-marking non-detecting state ($F_{camready}=0$) where the white lane marking exists outside of the image pick-up enabling area of CCD camera 13 and thus it is impossible to detect the white lane marking from the picture image data captured by CCD camera 13. The way to temporarily disable the LDP function may degrade the LDP control performance, or result in unnatural feeling that the driver experiences uncomfortable fluctuations of dynamic vehicle behavior, such as a yaw rate and a sideslip angle, for the reasons discussed below. In case of the way to temporarily disable the LDP function, the previously-discussed proportional gain K1 for calculation of desired yaw moment Ms is generally set to a comparatively great value so as to prevent the white lane marking from shifting from the image pick-up enabling area of CCD camera 13 to the image pick-up disabling area, and thus to keep the host vehicle substantially at the central position of the driving lane. The disadvantage of setting proportional gain K1 to the comparatively great value is the difficulty of ensuring the smooth host vehicle's dynamic behavior (smooth host vehicle's yawing motion), in other words, the problem of unnatural feeling that the driver experiences uncomfortable fluctuations of dynamic vehicle behavior.

On the other hand, suppose that front-left road wheel 5FL of the host vehicle begins to travel on predetermined road-surface irregularities, equidistantly repeatedly formed on the white lane marking (the white lane marking line) of the left-hand edge of the host vehicle's driving lane (see FIG. 9), under a state where the white lane marking shifts from the image pick-up enabling area of CCD camera 13 to the image-pick-up disabling area and thus it is impossible to detect the white lane marking from the picture image data captured by CCD camera 13 and consequently the host vehicle's lane-deviation tendency cannot be detected by means of CCD camera 13 and camera controller 14, after the LDP control has terminated. Under these conditions including at least the lane-deviation decision flag $F_{LD}$ reset ($F_{LD}$=0) due to termination of the LDP control, within the processor of ECU 8, first, input informational data from the previously-noted engine/vehicle switches and sensors, and driving-torque controller 12 and camera controller 14 are read (see step S1 of FIG. 2). As shown in the time period D of the time chart of FIG. 10A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{SO}$-TsL), is read or detected. In this case, of the picture image data, the host vehicle's yaw angle φ, lateral displacement X, and curvature β are all set to "0". Recognition flag $F_{camready}$ is reset to "0", since the white lane marking in front of the host vehicle is not captured by CCD camera 13 due to the transition from the lane-marking detecting state ($F_{camready}$=1) to the lane-marking non-detecting state ($F_{camready}$=0). At step S2, host vehicle speed V (=($Vw_{FL}$+$Vw_{FR}$)/2) is calculated. At step S3, lateral-displacement estimate XS is set to "0", because of φ=0, X=0, and β=0. Under the condition of $F_{camready}$=0, the count value of lost counter Lcnt is set to initial value Lcnt0 (>0), because of the presence of the transition from the lane-marking detecting state ($F_{camready}$=1) to the lane-marking non-detecting state ($F_{camready}$=0). Owing to the positive count value of lost counter Lcnt (Lcnt>0), virtual deviation estimate XSv is calculated based on the computation results (φo, Xo, βo) of the host vehicle's yaw angle, lateral displacement, and curvature, all obtained just before the transition from the lane-marking detecting state ($F_{camready}$=1) to the lane-marking non-detecting state ($F_{camready}$=0), from the expression XSv=Tt×V×(φo+Tt×V×βo)+Xv. In this case, the absolute value |XSv| of the calculated virtual deviation estimate XSv becomes greater than or equal to second lateral-displacement criterion $X_{CV}$. Then, at step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, on the basis of the value of lateral-displacement estimate XS (=0), lane-deviation decision flag $F_{LD}$ is kept at the reset state, because of XS=0 and consequently $-X_C$<XS(=0)<$X_C$. In this case, note that the current value of lane-deviation decision flag $F_{LD}$ is reset to "0" (i.e., $F_{LD}$=0) at the current execution cycle and the previous value $F_{LD20}$ of the lane-deviation decision flag has already been reset to "0" (i.e., $F_{LD20}$=0), because of the time period after termination of the LDP control. Under these conditions, the answer to step S9 becomes negative (NO), because of $F_{camready}$=0. Additionally, the answer to step S10 becomes negative (NO), since the previous value $F_{LD20}$ of the lane-deviation decision flag was "0" but not in the set state ($F_{LD20}$=+1 or −1) just before the transition from the lane-marking detecting state ($F_{camready}$=1) to the lane-marking non-detecting state ($F_{camready}$=0). Thus, the routine flows from step S10 through step S14 to step S15. At step S14, owing to the virtual-deviation-estimate absolute value |XSv| greater than or equal to second lateral-displacement criterion $X_{CV}$ (i.e., |XSv|≧$X_{CV}$), LDP control initiation enabling flag Fss is set to "1". On the basis of the states of LDP control initiation enabling flag Fss (=1) and road-edge decision flag Fdw (=+1), the answer to step S15 becomes affirmative (YES). Thus, the routine proceeds from step S15 to step S16. At step S16, in order to initiate the LDP control (the vehicle yawing motion control), virtual lane-deviation decision flag $F_{LD2}$ is set to "1". Thereafter, through step S17, on the basis of the states of three flags, namely lane-deviation decision flag $F_{LD}$, LDP control continuation decision flag Fsk, and virtual lane-deviation decision flag $F_{LD2}$, desired yaw moment Ms is fixed to predetermined constant value Me, because of $F_{LD}$=0 and Fsk=0 and $F_{LD2}$=1. At step S18, on the basis of the calculated desired yaw moment Ms (=Me), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (12)). Thereafter, the routine advances via step S19 to step S20. At step S20, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S18, are output from the input interface of ECU 8 to hydraulic modulator 7. As a result (see the flow from step S1 through steps S2-S8 and S9-S10 via steps S14-S16 to steps S17-S20), a constant yawing moment, needed to rotate the host vehicle to the right, can be created, thus enabling the host vehicle to return to the central position of the driving lane by way of the vehicle yawing motion control and consequently avoiding the host vehicle from deviating from the driving lane.

As set out above, according to the system of the embodiment executing the LDP control routine of FIG. 2, if the LDP control system determines that the host vehicle begins to run on the predetermined road-surface irregularities formed on the white lane marking, even when, during termination of LDP control (with the lane-deviation decision flag $F_{LD}$ reset), there is a transition from a state ($F_{camready}$=1) where a white lane marking exists within the image pick-up enabling area of CCD camera 13 to a state ($F_{camready}$=0) where the white lane marking exists outside of the image pick-up enabling area of CCD camera 13 and thus it is impossible to detect the white lane marking from the picture image data captured by CCD camera 13, a constant yawing moment, needed to rotate the host vehicle to the right, can be created. Thus, it is possible to remarkably enhance the LDP control system's ability to avoid the host vehicle's lane deviation, even in the lane-marking non-detecting state ($F_{camready}$=0) where the white lane marking exists outside of the image pick-up enabling area of CCD camera 13 and thus it is impossible to detect the white lane marking from the picture image data captured by CCD camera 13.

Figure 11:
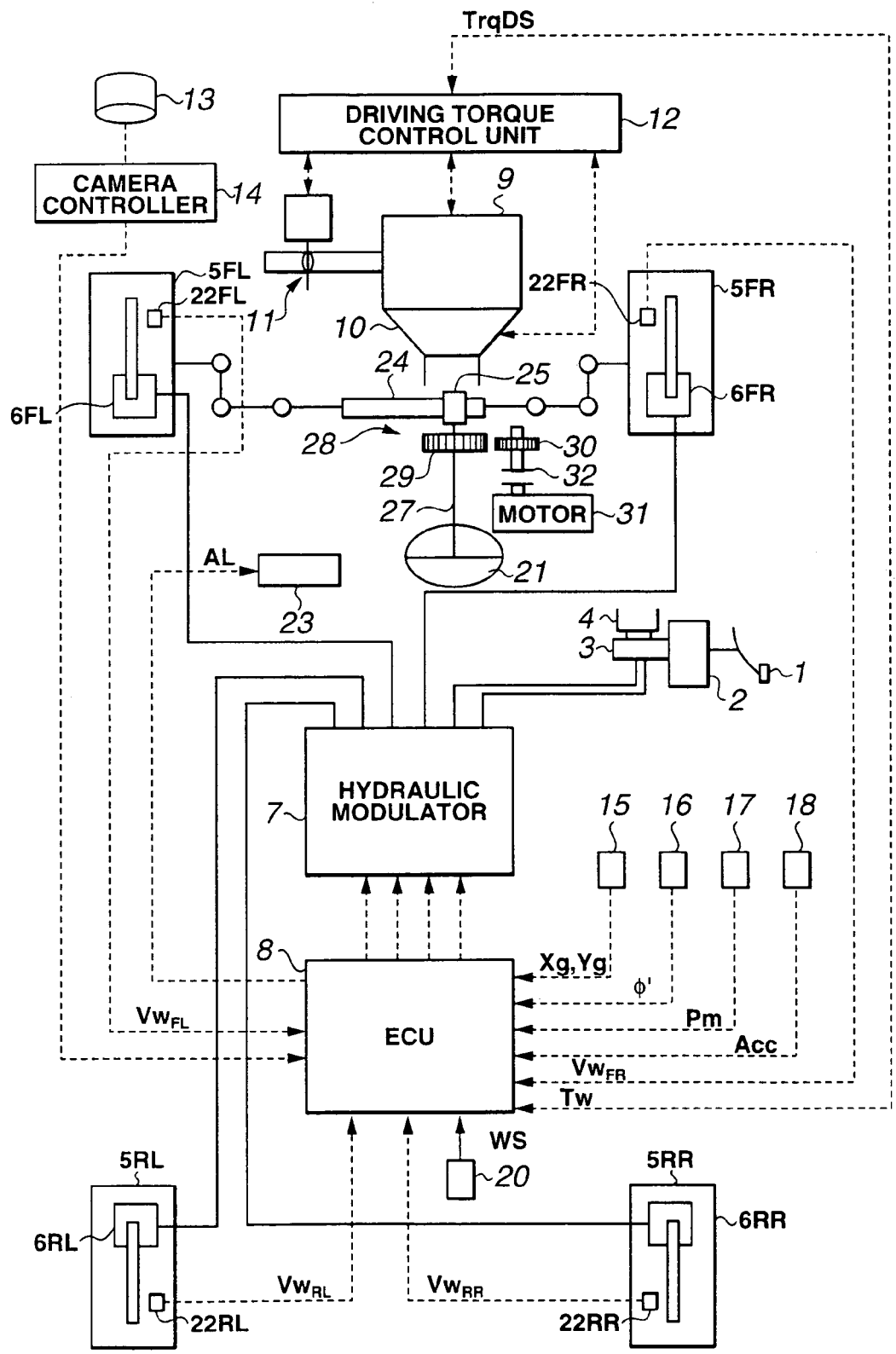
FIG. 11 is a system block diagram illustrating a modified LDP apparatus employing a steering-actuator equipped LDP control system.

Referring now to FIG. 11, there is shown the modified automotive LDP apparatus employing the steering-actuator equipped LDP control system through which a steering torque is automatically produced in a direction that the host vehicle returns to the central axis (the central position) of the driving lane, when the processor of ECU 8 detects or determines that either one of front road wheels 5FL and 5FR of the host vehicle travels on predetermined road-surface irregularities, equidistantly repeatedly formed on the white lane marking of the left-hand side (the leftmost edge) or the right-hand side (the rightmost edge) of the host vehicle's driving lane.

As shown in FIG. 11, a conventional rack-and-pinion steering mechanism is provided between front road wheels 5FL and 5FR. The conventional steering mechanism is comprised of at least a rack 24 linked to a steering arm such as a steering knuckle of each front road wheel 5FL (5FR), a pinion 25 in meshed-engagement with rack 24, and a steering shaft 27 through which steering torque is transmitted from steering wheel 21 to pinion gear 25. An auto-steering mechanism or an auto-pilot mechanism 28, which constructs a steering actuator (serving as a vehicle yawing motion control actuator) used for automatic steering action or auto-pilot for the front road wheels, is also provided above the pinion 25. Auto-steering mechanism 28 is comprised of a driven gear 29 coaxially fixedly connected to steering shaft 27, a drive gear 30 in meshed-engagement with driven gear 29, and an auto-steering motor 31 that drives drive gear 30. A clutch mechanism 32 is also provided between the motor shaft of auto-steering motor 31 and drive gear 30, for connecting the auto-steering motor shaft to, or disconnecting it from the shaft of drive gear 30. Only during operation of auto-steering mechanism 28, in other words, only during the auto-steering control mode, clutch mechanism 32 is held engaged. During the inoperative state of auto-steering mechanism 28, clutch mechanism 32 is disengaged to prevent input torque created by auto-steering motor 31 from being transmitted to steering shaft 27.

Figure 12:
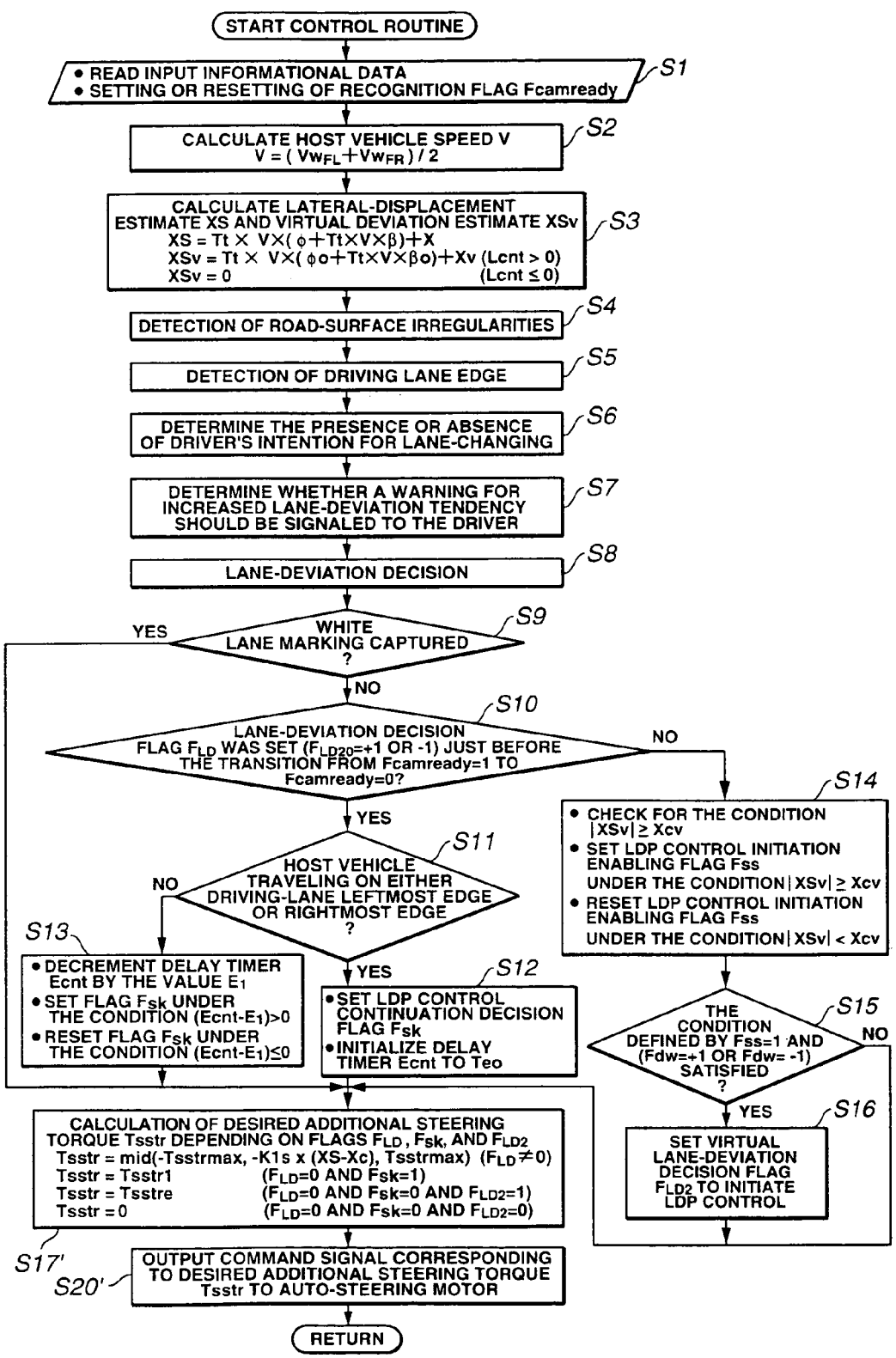
FIG. 12 is a flow chart showing a control routine (arithmetic and logic operations) executed within a braking/driving force control unit incorporated in the modified LDP apparatus shown in FIG. 11.

The LDP control routine executed by ECU 8 incorporated in the steering-actuator equipped automotive LDP apparatus shown in FIG. 11 is hereunder described in detail in reference to the flow chart shown in FIG. 12. The LDP control routine of FIG. 12 is also executed as time-triggered interrupt routines to be triggered every predetermined sampling time intervals ΔT such as 20 milliseconds. Briefly speaking, the control routine of FIG. 12 is different from that of FIG. 2, in that in the system executing the routine of FIG. 12 a desired additional steering torque Tsstr (described later and different from a steering torque manually acting on the steering wheel by the driver) is used for automatic LDP control instead of controlling braking forces applied to respective road wheels. The routine of FIG. 12 is similar to that of FIG. 2, except that steps S17-S20 included in the routine shown in FIG. 2 are replaced by steps S17' and S20' included in the routine shown in FIG. 12. Thus, the same step numbers used to designate steps in the routine shown in FIG. 2 will be applied to the corresponding step numbers used in the routine shown in FIG. 12, for the purpose of comparison of the two different interrupt routines shown in FIGS. 2 and 12. Steps S17' and S20' will be hereinafter described in detail with reference to the accompanying drawings, while detailed description of steps S1-S16 will be omitted because the above description thereon seems to be self-explanatory.

At step S17', the processor of ECU 8 calculates or determines desired additional steering torque Tsstr, based on the state of lane-deviation decision flag $F_{LD}$. Concretely, a check is made to determine whether lane-deviation decision flag $F_{LD}$ is set (=+1 or −1). When the condition defined by $F_{LD} \neq 0$ ($F_{LD}$=+1 or $F_{LD}$=−1) is satisfied, in other words, the processor of ECU 8 determines that it is necessary to generate a yawing moment by way of LDP control of the steering-actuator equipped LDP control system, desired additional steering torque Tsstr is arithmetically calculated from the following expression (14), corresponding to a so-called select-MID process according to which an middle value of three values, that is, −Tsstrmax, −K1s×(XS−$X_C$), and Tsstrmax is selected as the current value of desired additional steering torque Tsstr.

$$Tsstr = mid(-Tsstrmax, -K1s \times (XS-X_C), Tsstrmax) \quad (14)$$

where Tsstrmax denotes an upper limit of the desired additional steering torque, −Tsstrmax denotes a lower limit of the desired additional steering torque, K1s denotes a constant that is determined by specifications of the host vehicle, and (XS−$X_C$) denotes the difference between lateral-displacement estimate XS and first lateral-displacement criterion $X_C$.

In contrast, when the condition defined by $F_{LD}$=0 is satisfied, another check is made to determine whether or not LDP control continuation decision flag Fsk is set to "1". When the condition defined by $F_{LD}$=0 and Fsk=1 is satisfied, desired additional steering torque Tsstr is set to a predetermined value Tsstr1. Predetermined value Tsstr1 corresponds to the desired additional steering torque obtained just before the transition from the lane-marking detecting state ($F_{camready}$=1) to the lane-marking non-detecting state ($F_{camready}$=0), in other words, the previous value $Tsstr_{20}$ of desired additional steering torque Tsstr, calculated one cycle before (i.e., 20 milliseconds before).

Conversely when the condition defined by $F_{LD}$=0 and Fsk=1 is unsatisfied, a further check is made to determine whether virtual lane-deviation decision flag $F_{LD2}$ is set to "1". When the condition defined by $F_{LD}$=0 and Fsk=0 and $F_{LD2}$=1 is satisfied, desired additional steering torque Tsstr is set to a predetermined constant value Tsstre. Conversely when the condition defined by $F_{LD}$=0 and Fsk=0 and $F_{LD2}$=0 is satisfied, desired additional steering torque Tsstr is set to "0".

As discussed above, in the LDP apparatus capable of executing the routine of FIG. 12, desired additional steering torque Tsstr is calculated or determined as a controlled variable for feedback control (LDP control). Instead of using the closed-loop feedback control for the additional steering torque, desired additional steering torque Tsstr may be estimated and determined such that a desired lateral displacement and a desired sideslip angle of the host vehicle are achieved by way of a vehicle model such as a two-wheel model, in other words, by way of an observer function. After step S17', step S20' occurs.

At step S20', a command signal (or a drive signal) corresponding to desired additional steering torque Tsstr calculated through step S17', is output from the input interface of ECU 8 to auto-steering motor 31. In this manner, one cycle of the time-triggered interrupt routine (the routine of FIG. 12) terminates and the predetermined main program is returned.

The automotive LDP apparatus executing the additional-steering-torque based LDP control routine shown in FIG. 12 operates as follows.

During LDP control, suppose that front-left road wheel 5FL of the host vehicle begins to travel on predetermined road-surface irregularities, equidistantly repeatedly formed on the white lane marking (the white lane marking line) of the left-hand edge of the host vehicle's driving lane (see FIG. 9), and thus there is a transition from a lane-marking detecting state ($F_{camready}=1$) where a white lane marking exists within the image pick-up enabling area of CCD camera 13 to a lane-marking non-detecting state ($F_{camready}=0$) where the white lane marking exists outside of the image pick-up enabling area of CCD camera 13 and it is impossible to detect the white lane marking from the picture image data captured by CCD camera 13. In such a case, it is impossible to detect or determine the host vehicle's lane-deviation tendency, from the CCD-camera picture image data. Under these conditions, as explained hereunder, the routine flows from step S1 through steps S2-S8 and S9-S12 to steps S17' and S20'. Within the processor of ECU 8, first, input informational data from the previously-noted engine/vehicle switches and sensors, and driving-torque controller 12 and camera controller 14 are read (see step S1 of FIG. 2). As shown in the time period D of the time chart of FIG. 10A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{SO}$-TsL), is read or detected. In this case, of the picture image data, the host vehicle's yaw angle φ, lateral displacement X, and curvature β are all set to "0". Recognition flag $F_{camready}$ is reset to "0", since the white lane marking in front of the host vehicle cannot be captured by CCD camera 13 due to the transition from the lane-marking detecting state ($F_{camready}=1$) to the lane-marking non-detecting state ($F_{camready}=0$). At step S2, host vehicle speed V (=($Vw_{FL}$+$Vw_{FR}$)/2) is calculated. At step S3, lateral-displacement estimate XS is set to "0", because of φ=0, X=0, and β=0. On the other hand, the count value of lost counter Lcnt is set to initial value Lcnt0 (>0), because of the presence of the transition from the lane-marking detecting state ($F_{camready}=1$) to the lane-marking non-detecting state ($F_{camready}=0$). Owing to the positive count value of lost counter Lcnt (Lcnt>0), virtual deviation estimate XSv is calculated based on the computation results (φo, Xo, βo) of the host vehicle's yaw angle, lateral displacement, and curvature, all obtained just before the transition from the lane-marking detecting state ($F_{camready}=1$) to the lane-marking non-detecting state ($F_{camready}=0$), from the expression XSv=Tt×V×(φo+Tt×V×βo)+Xv. At step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, on the basis of the value of lateral-displacement estimate XS (=0), lane-deviation decision flag $F_{LD}$ is switched from the set state ($F_{LD20}=+1$) to the reset state ($F_{LD}=0$), owing to XS=0, i.e., $-X_C<XS(=0)<X_C$. Under these conditions, the answer to step S9 becomes negative (NO), because of $F_{camready}=0$. Additionally, the answer to step S10 becomes affirmative (YES), since the previous value $F_{LD20}$ of the lane-deviation decision flag was "+1" just before the transition from the lane-marking detecting state ($F_{camready}=1$) to the lane-marking non-detecting state ($F_{camready}=0$). On the other hand, the answer to step S11 becomes affirmative (YES), because of Fdw=+1. Therefore, the routine advances from step S9 through steps S10-S11 to step S12 and thus LDP control continuation decision flag Fsk is set to "1" and additionally the count value of delay timer Ecnt is initialized to initial set value Teo. Thus, under the condition of $F_{LD}=0$ and Fsk=1, through step S17', desired additional steering torque Tsstr is set to predetermined value Tsstr1, that is, Tsstr=Tsstr1=Tsstr$_{20}$ (calculated just before the transition from the lane-marking detecting state $F_{camready}=1$ to the lane-marking non-detecting state $F_{camready}=0$ and corresponding to the previous desired additional steering torque value Tsstr$_{20}$ calculated one cycle before (i.e., 20 milliseconds before), so that the controlled variable of LDP control remains unchanged. Thereafter, at step S20', a command signal (a drive signal) corresponding to desired additional steering torque Tsstr (=Tsstr1), is output from the input interface of ECU 8 to auto-steering motor 31. As a result, by way of auto-steering control, the actual additional steering torque of steering shaft 27 is kept at the desired additional steering torque Tsstr, that is, the previous value Tsstr1, and thus a proper steering angle tending to rotate the host vehicle to the right (clockwise direction as viewed from the top view of FIG. 9) can be created, thus enabling the host vehicle to return to the central position of the driving lane by way of the vehicle yawing motion control and consequently avoiding the host vehicle from deviating from the driving lane.

As discussed above, in case of the LDP control system executing the routine of FIG. 12, the command signal (the drive signal) corresponding to desired additional steering torque Tsstr, calculated through step S17', is output to auto-steering motor 31, and as a result the automatically-controlled steer angle δ is produced in a direction that the host vehicle returns to the central axis (the central position) of the current driving lane. In the steering-actuator equipped LDP control system shown in FIGS. 11 and 12, auto-steering mechanism 28, serving as a steering actuator, is used to exert a yawing moment on the host vehicle instead of using hydraulic modulator 7, and thus it is possible to generate a desired yawing moment without decelerating the host vehicle and without giving a feeling of uncomfortable vehicle deceleration to the driver.

In the automotive LDP apparatus of the shown embodiments, capable of executing the respective routines shown in FIGS. 2 and 12, CCD camera 13 shown in FIGS. 1 and 11 serves as a picture image pick-up device or a picture image pick-up means. Camera controller 14 shown in FIGS. 1 and 11 serves as a lane marking detector or a lane marking detection means. The process of step S8 shown in FIGS. 2 and 12 serves as a lane-deviation tendency detector or a lane-deviation tendency detection means. The process of each of steps S17-S18 shown in FIG. 2 and step S17' shown in FIG. 12 serves as an LDP control means and a vehicle yawing motion control means. The process of steps S4 and S5 shown in FIGS. 2 and 12, and wheel speed sensors 22FL-22RR serve as a road-surface irregularities detection means. Wheel speed sensors 22FL-22RR shown in FIGS. 1 and 11 serve as a wheel-speed detection means. Engine/vehicle switches and sensors and camera controller 14 shown in FIGS. 1 and 11 serve as a driving condition detection means. The process of steps S3 and S14 shown in FIGS. 2 and 12 serves as a lane-deviation tendency estimation means.

In the shown embodiments shown herein, a check for such a state that either one of front road wheels 5FL and 5FR of the host vehicle is traveling on predetermined road-surface irregularities, formed on the white lane marking (the white lane line), is based on front-left and front-right wheel speeds $Vw_{FL}$ and $Vw_{FR}$, exactly, comparison results of front-left wheel acceleration $dVw_{FL}$ and its threshold value $S_{limit}$ and front-right wheel acceleration $dVw_{FR}$ and its threshold value $S_{limit}$. In lieu thereof, such a check may be based on a vertical acceleration of a point of the vehicle suspension, moving up and down or a suspension stroke. In this case, sensor signals from an acceleration sensor (a suspension vertical acceleration sensor or G sensor 15 as shown in FIG. 1) and/or a stroke sensor commonly used for active suspension control of active suspension system equipped vehicles can also be used for the LDP control system. The use of an acceleration sensor and/or a stroke sensor common to active suspension control and LDP control, as a whole, contributes to an inexpensive combined system of active suspension control and LDP control.

Furthermore, when the external recognizing sensor (also serving as a vehicle-path detector) containing the navigation system and/or CCD camera 13 detects that the host vehicle is traveling within a car parking area except road-ways, a check made to determine whether or not either one of front road wheels 5FL and 5FR of the host vehicle is traveling on predetermined road-surface irregularities formed on the white lane marking, may be inhibited to enhance the accuracy of road-surface irregularities detection executed through step S4.

Figure 13:
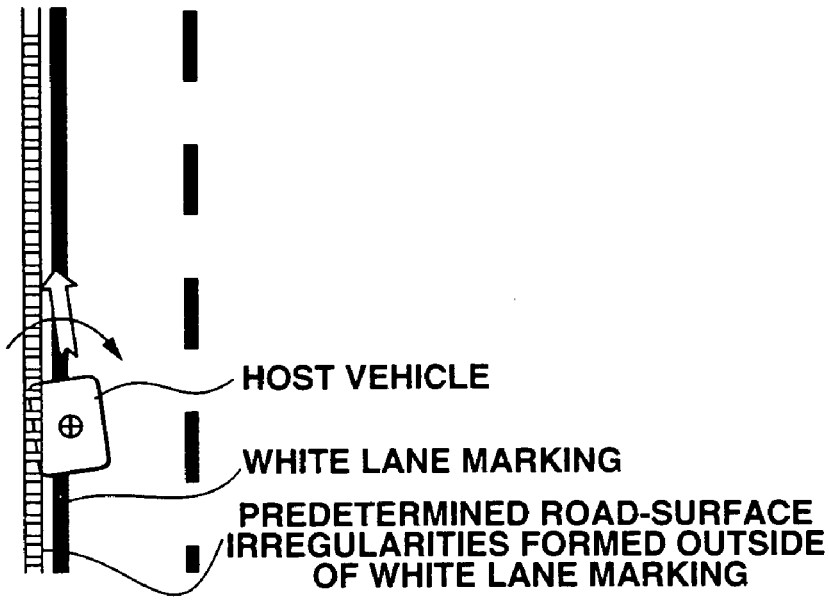
FIG. 13 is an explanatory view showing control actions performed by the modified LDP apparatus executing the routine shown in FIG. 12.

In the shown embodiments, road-surface irregularities decision flag $Fot_{FL}$ (or $Fot_{FR}$) is set to "1", when front-left road wheel 5FL (or front-right road wheel 5FR) is traveling on the predetermined irregularities (corresponding to the ridge portions exemplified in FIG. 3A) equidistantly repeatedly formed on the white lane marking. In lieu thereof, as shown in FIG. 13, road-surface irregularities decision flag $Fot_{FL}$ (or $Fot_{FR}$) may be set to "1", when front-left road wheel 5FL (or front-right road wheel 5FR) is traveling on predetermined irregularities equidistantly repeatedly formed outside of and close to the white lane marking. As seen from the plan view of FIG. 13, preferably, the predetermined irregularities are arranged parallel to and slightly spaced from the white lane marking by a predetermined distance.

Figure 14:
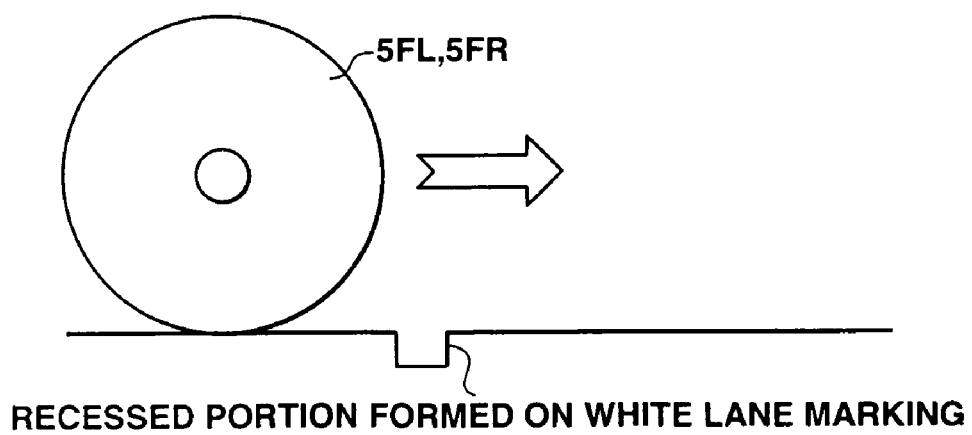
FIG. 14 is an explanatory view showing a modification of wheel speed fluctuations and wheel acceleration fluctuations, occurring due to irregularities of the road surface.

In the shown embodiments, road-surface irregularities decision flag $Fot_{FL}$ (or $Fot_{FR}$) is set to "1", when front-left road wheel 5FL (or front-right road wheel 5FR) is traveling on the predetermined irregularities equidistantly repeatedly formed on the white lane marking by forming the ridged portions (see FIG. 4A) on the lane marking. In lieu thereof, as shown in FIG. 14, road-surface irregularities decision flag $Fot_{FL}$ (or $Fot_{FR}$) may be set to "1", when front-left road wheel 5FL (or front-right road wheel 5FR) is traveling on the predetermined irregularities equidistantly repeatedly formed on the white lane marking by forming recessed portions on the lane marking.

In the shown embodiments, a check for such a state that either one of front road wheels 5FL and 5FR of the host vehicle is traveling on predetermined road-surface irregularities, formed on the white lane marking (the white lane marking line), that is, setting of road-edge decision flag Fdw to "+1" (or to "−1"), is based on front-left and front-right wheel speeds $Vw_{FL}$ and $Vw_{FR}$, exactly, comparison results of front-left wheel acceleration $dVw_{FL}$ and its threshold value $S_{limit}$ and front-right wheel acceleration $dVw_{FR}$ and its threshold value $S_{limit}$. In lieu thereof, setting of road-edge decision flag Fdw may be based on rear-left and rear-right wheel speeds $Vw_{RL}$ and $Vw_{RR}$, exactly, comparison results of rear-left wheel acceleration $dVw_{RL}$ and its threshold value $S_{limitR}$ and rear-right wheel acceleration $dVw_{RR}$ and its threshold value $S_{limitR}$.

In the shown embodiments, when either one of flags $Fot_{FL}$ and $Fot_{FR}$ is set to "1" and road-surface irregularities decision flag $Fot_{FL}$ for front-left road wheel 5FL is set (=1), road-edge decision flag Fdw is set to "+1". When either one of flags $Fot_{FL}$ and $Fot_{FR}$ is set to "1" and road-surface irregularities decision flag $Fot_{FR}$ for front-right road wheel 5FR is set (=1), road-edge decision flag Fdw is set to "−1".

Alternatively, when road-surface irregularities decision flag $Fot_{FL}$ for front-left road wheel 5FL and road-surface irregularities decision flag $Fot_{RL}$ for rear-left road wheel 5RL are both set (=1), road-edge decision flag Fdw may be set to "+1". On the contrary when road-surface irregularities decision flag $Fot_{FR}$ for front-right road wheel 5FR and road-surface irregularities decision flag $Fot_{RR}$ for rear-right road wheel 5RR are both set (=1), road-edge decision flag Fdw may be set to "−1". Such setting of road-edge decision flag Fdw enhances the reliability of setting of road-edge decision flag Fdw.

As discussed above, when either front-left road wheel 5FL or rear-left road wheel 5RL is traveling on predetermined irregularities formed on or close to a white lane marking line or when left road wheels 5FL and 5RL are both traveling on the predetermined irregularities formed on or close to the white lane marking line, road-edge decision flag Fdw may be set to "+1". On the contrary when either front-right road wheel 5FR or rear-right road wheel 5RR is traveling on the predetermined irregularities formed on or close to the white lane marking line or when right road wheels 5FR and 5RR are both traveling on the predetermined irregularities formed on or close to the white lane marking line, road-edge decision flag Fdw may be set to "−1".

In the shown embodiments, as can be appreciated from the output of the previous value $MS20$ (=M1) of the desired yaw moment calculated one cycle before (or calculated just before the transition from the lane-marking detecting state $F_{camready}=1$ to the lane-marking non-detecting state $F_{camready}=0$) or the output of the previous value $Tsstr_{20}$ (=Tsstr1) of the desired additional steering torque calculated one cycle before (see the flow from S9 through steps S10-S12 to step S17 of FIG. 2 or to step S17' of FIG. 12), the controlled variable of LDP control remains unchanged (Ms=M1=Ms20 or Tsstr=Tsstr1=Tsstr$_{20}$), when either one of front road wheels of the host vehicle begins to travel on predetermined road-surface irregularities formed on the white lane marking, in presence of the transition from the lane-marking detecting state ($F_{camready}=1$) to the lane-marking non-detecting state ($F_{camready}=0$). Instead of keeping the controlled variable of LDP control at the previous value ($MS20$ or $Tsstr_{20}$), the controlled variable of LDP control may be set to a higher value than the previous value, for example 1.5 times the previous value, that is, 1.5×MS20 or 1.5×Tsstr$_{20}$, when the predetermined condition defined by Fsk=1 and Fdw≠0 (i.e., Fdw=+1 or −1) is satisfied. Even when a time period during which road-edge decision flag Fdw is maintained in the set state (Fdw=+1 or −1) is very short, it is possible to effectively avoid the host vehicle from deviating from the driving lane, owing to setting the controlled variable of LDP control to the higher value (1.5×MS20 or 1.5×Tsstr$_{20}$).

The entire contents of Japanese Patent Application No. 2003-132899 (filed May 12, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation prevention (LDP) apparatus, comprising:
   (a) a lane marking detection section configured to detect a lane marking line of a driving lane of a host vehicle, based on a picture image in front of the host vehicle;
   (b) a lateral displacement estimation section configured to estimate, based on the lane marking line, a future lateral displacement of the host vehicle relative to the host vehicle's driving lane;
   (c) a road surface irregularities detection section configured to determine whether the host vehicle is traveling on predetermined road surface irregularities formed on or close to the lane marking line; and (d) a vehicle yawing motion control section configured to execute vehicle yawing motion control by which the host vehicle returns toward a central position of the host vehicle's driving lane;

wherein the vehicle yawing motion control section initiates the vehicle yawing motion control when all following conditions occur:

(1) when the host vehicle is traveling on predetermined road surface irregularities;

(2) while the lane marking detection section cannot recognize or detect the lane marking line; and (3) an absolute value of the future lateral displacement, immediately before the lane marking detection section cannot recognize or detect the lane marking line, is greater than or equal to a predetermined lateral displacement criterion.

2. The automotive lane deviation prevention apparatus as claimed in claim 1, further comprising:

wheel speed sensors configured to detect respective wheel speeds of road wheels of the host vehicle, wherein the road surface irregularities detection section is configured to determine that the host vehicle is traveling on predetermined road surface irregularities when at least one of the wheel speeds detected by the wheel speed sensors is fluctuating at a substantially constant oscillation frequency in relation to a host vehicle speed.

3. The automotive lane deviation prevention apparatus as claimed in claim 2, wherein:

the road-surface irregularities detection section is configured to determine that the host vehicle is traveling on predetermined road surface irregularities only when either one of left and right wheel speeds is fluctuating.

4. The automotive lane deviation prevention apparatus as claimed in claim 1, further comprising:

a vehicle-suspension up-and-down motion sensor configured to detect an up-and-down motion of a suspension of the host vehicle, wherein the road surface irregularities detection section is configured to determine, based on the suspension's up-and-down motion detected, whether the host vehicle is traveling on predetermined road surface irregularities.

5. The automotive lane deviation prevention apparatus as claimed in claim 1, further comprising a processor programmed to perform the following, (1) determining whether the host vehicle is traveling within an area except road-ways; and (2) inhibiting a check for the host vehicle traveling on the predetermined road surface irregularities, when the host vehicle is traveling within the area except road-ways.

6. An automotive lane deviation prevention (LDP) apparatus, comprising:

(a) lane marking detection means for detecting a lane marking line of a driving lane of a host vehicle, based on a picture image in front of the host vehicle;

(b) lateral displacement estimation means for estimating, based on the lane marking line, a future lateral displacement of the host vehicle relative to the host vehicle's driving lane;

(c) road surface irregularities detection means for detecting whether the host vehicle is traveling on predetermined road surface irregularities formed on or close to the lane marking line; and (d) vehicle yawing motion control means for executing vehicle yawing motion control by which the host vehicle returns toward a central position of the host vehicle's driving lane;

wherein the vehicle yawing motion control means initiates the vehicle yawing motion control when all following conditions occur:

(1) when the host vehicle is traveling on predetermined road surface irregularities;

(2) while the lane marking detection means cannot recognize or detect the lane marking line; and (3) an absolute value of the future lateral displacement, immediately before the lane marking detection means cannot recognize or detect the lane marking line, is greater than or equal to a predetermined lateral displacement criterion.

7. The automotive lane deviation prevention apparatus as claimed in claim 6, further comprising:

sensor means for detecting respective wheel speeds of road wheels of the host vehicle, wherein the road surface irregularities detection means is configured to determine that the host vehicle is traveling on predetermined road surface irregularities when at least one of the wheel speeds detected by the sensor means is fluctuating at a substantially constant oscillation frequency in relation to a host vehicle speed.

8. The automotive lane deviation prevention apparatus as claimed in claim 7, wherein:

the road surface irregularities detection means determines that the host vehicle is traveling on predetermined road surface irregularities only when either one of left and right wheel speeds is fluctuating.

9. The automotive lane deviation prevention apparatus as claimed in claim 6, further comprising:

vehicle-suspension up-and-down motion sensor means for detecting an up-and-down motion of a suspension of the host vehicle, wherein the road surface irregularities detection means determines, based on the suspensions s up-and-down motion detected, whether the host vehicle is traveling on predetermined road surface irregularities.

10. The automotive lane deviation prevention apparatus as claimed in claim 6, further comprising a processor programmed to perform the following, (1) determining whether the host vehicle is traveling within an area except road-ways; and (2) inhibiting a check for the host vehicle traveling on the predetermined road surface irregularities, when the host vehicle is traveling within the area except road-ways.

* * * * *